(12) United States Patent
Bharadwaj et al.

(10) Patent No.: US 12,513,664 B2
(45) Date of Patent: Dec. 30, 2025

(54) RESOURCE RESERVATION TECHNIQUES FOR WIRELESS COMMUNICATIONS

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Kapil Gulati, Belle Mead, NJ (US); Sudhir Kumar Baghel, Pleasanton, CA (US)

(73) Assignee: Qualcomm Incorporated, San Diego, CA (US)

( * ) Notice: Subject to any disclaimer, the term of this patent is extended or adjusted under 35 U.S.C. 154(b) by 284 days.

(21) Appl. No.: 18/075,703

(22) Filed: Dec. 6, 2022

(65) Prior Publication Data

US 2023/0093854 A1    Mar. 30, 2023

Related U.S. Application Data

(63) Continuation of application No. 16/737,775, filed on Jan. 8, 2020, now abandoned.
(Continued)

(51) Int. Cl.
*H04W 4/40* (2018.01)
*H04B 7/06* (2006.01)
(Continued)

(52) U.S. Cl.
CPC .............. *H04W 72/02* (2013.01); *H04W 4/40* (2018.02); *H04W 72/044* (2013.01); *H04W 72/20* (2023.01); *H04W 92/18* (2013.01)

(58) Field of Classification Search
CPC ....... H04W 72/02; H04W 4/40; H04W 28/26; H04W 72/0446; H04W 4/46; H04W 72/04
(Continued)

(56) References Cited

U.S. PATENT DOCUMENTS

| 10,999,832 B2* | 5/2021 | Lin .................... H04L 1/0013 |
| 2012/0110356 A1* | 5/2012 | Yousefi .................. B60R 19/03 |
| | | 713/320 |

(Continued)

FOREIGN PATENT DOCUMENTS

| CN | 107347215 A | 11/2017 |
| CN | 108028743 A | 5/2018 |

(Continued)

OTHER PUBLICATIONS

International Preliminary Report on Patentability—PCT/US2020/012953, The International Bureau of WIPO—Geneva, Switzerland, Jul. 22, 2021.
(Continued)

*Primary Examiner* — Marcus Smith
*Assistant Examiner* — Jason A Harley
(74) *Attorney, Agent, or Firm* — Holland & Hart LLP

(57) ABSTRACT

Methods, systems, and devices for wireless communications are described that provide for dynamic resource avoidance and slot aggregation. The described techniques enable a user equipment (UE) in a vehicle-to-everything (V2X) system to select resources for varying transmission of a data packet (e.g., over multiple slots). The UE may determine a set of candidate transmission time intervals (TTIs) for transmission of the data packet based on a resource map, which may involve selecting resources that are unoccupied by other UEs as indicated by the resource map or preempting other UEs based on traffic priority or latency. The UE may transmit a reservation indication indicating resources to be reserved for subsequent transmissions (e.g., retransmission) and a UE receiving the reservation indication may update its resource map.

28 Claims, 15 Drawing Sheets

Related U.S. Application Data

(60) Provisional application No. 62/790,765, filed on Jan. 10, 2019.

(51) Int. Cl.

| | | |
|---|---|---|
| *H04W 4/44* | (2018.01) | |
| *H04W 28/26* | (2009.01) | |
| *H04W 72/02* | (2009.01) | |
| *H04W 72/04* | (2023.01) | |
| *H04W 72/044* | (2023.01) | |
| *H04W 72/12* | (2023.01) | |
| *H04W 72/20* | (2023.01) | |
| *H04W 72/56* | (2023.01) | |
| *H04W 88/02* | (2009.01) | |
| *H04W 92/18* | (2009.01) | |

(58) Field of Classification Search
USPC .................................................. 370/254, 458
See application file for complete search history.

(56) References Cited

U.S. PATENT DOCUMENTS

| | | | |
|---|---|---|---|
| 2012/0120889 A1 | 5/2012 | Cheng et al. | |
| 2012/0155413 A1* | 6/2012 | Liu ...................... | H04L 1/1861 |
| | | | 370/329 |
| 2015/0326492 A1* | 11/2015 | Jeong ................ | H04W 74/0866 |
| | | | 370/329 |
| 2017/0188391 A1* | 6/2017 | Rajagopal ......... | H04W 74/0816 |
| 2017/0280472 A1* | 9/2017 | Gupta .................. | H04W 72/51 |
| 2018/0063840 A1 | 3/2018 | Zhang | |
| 2018/0098322 A1* | 4/2018 | Yoon ..................... | H04W 72/23 |
| 2018/0136869 A1* | 5/2018 | Mola ...................... | G06F 11/30 |
| 2018/0302182 A1 | 10/2018 | Ly et al. | |
| 2018/0332620 A1 | 11/2018 | Malladi et al. | |
| 2019/0020657 A1 | 1/2019 | Egner et al. | |
| 2019/0021072 A1* | 1/2019 | Horiuchi ............... | H04L 5/0055 |
| 2019/0059071 A1* | 2/2019 | Khoryaev ............ | H04W 4/021 |
| 2019/0200355 A1 | 6/2019 | Baldemair et al. | |
| 2019/0208504 A1* | 7/2019 | Yasukawa ............ | H04W 24/10 |
| 2019/0313279 A1 | 10/2019 | Li et al. | |
| 2019/0320435 A1* | 10/2019 | Yu ......................... | H04W 72/21 |
| 2019/0357174 A1* | 11/2019 | Zhao .................... | H04L 27/261 |
| 2019/0364492 A1 | 11/2019 | Azizi et al. | |
| 2020/0044814 A1* | 2/2020 | Kim ...................... | H04W 52/52 |
| 2020/0229144 A1* | 7/2020 | Bharadwaj .......... | H04W 72/044 |
| 2020/0275458 A1* | 8/2020 | Khoryaev ............. | H04W 72/12 |
| 2021/0204284 A1* | 7/2021 | Lin ....................... | H04W 72/20 |

FOREIGN PATENT DOCUMENTS

| | | |
|---|---|---|
| EP | 3468272 A1 | 4/2019 |
| KR | 20190000891 A | 1/2019 |

OTHER PUBLICATIONS

International Search Report and Written Opinion—PCT/US2020/012953—ISA/EPO—Aug. 24, 2020.

ZTE: "Consideration on Short TTI Based PC5 Operation," 3GPP Draft, R2-1708511, 3GPP TSG-RAN WG2 Meeting #99, Consideration on Short TTI Based PC5 Operation, 3rd Generation Partnership Project (3GPP), Mobile Competence Centre; 650, Route Des Lucioles; F-06921 Sophia-Antipolis Cedex; vol. RAN WG2, No. Berlin, Germany; Aug. 21, 2017-Aug. 25, 2017, Aug. 20, 2017, XP051318366, 5 pages, section 1; p. 1 section 2; pp. 1-4.

* cited by examiner

RESOURCE RESERVATION TECHNIQUES FOR WIRELESS COMMUNICATIONS

CROSS REFERENCE

The present Application for Patent is a continuation of U.S. patent application Ser. No. 16/737,775 filed Jan. 8, 2020, which claims the benefit of U.S. Provisional Patent Application No. 62/790,765 by BHARADWAJ et al., entitled "RESOURCE RESERVATION TECHNIQUES FOR WIRELESS COMMUNICATIONS," filed Jan. 10, 2019, both of which are assigned to the assignee hereof and expressly incorporated herein.

BACKGROUND

The following relates generally to wireless communications, and more specifically to resource reservation techniques for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may include or support networks used for direct communications between wireless devices, e.g., direct communications between multiple UEs. Examples of direct communications include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like.

Some wireless communications systems may support communications for a number of UEs, which may result in collisions or other interference on resources utilized by multiple UEs. Further, some UEs may operate according to a half-duplexing mode such that the UE may be unable to transmit and receive signals at the same time due to the effects of interference between an incoming transmission and an outgoing transmission. In systems employing half-duplex UEs or including a number of UEs that are at risk of interfering with one another, resources may be assigned to UEs periodically (e.g., based on a predefined periodicity) and the resources of a certain time interval may be reserved for one or more UEs. Scheduling resources in this manner may be inefficient and may result in poor performance (e.g., in cases where data packet size varies and resource allocation sizes are fixed).

SUMMARY

The described techniques relate to improved methods, systems, devices, and apparatuses that support resource reservation techniques for wireless communications. Generally, the described techniques provide for allocation of resources using dynamic resource avoidance and slot aggregation. The described techniques may enable a user equipment (UE) in a vehicle-to-everything (V2X) system (or other systems such as vehicle-to-vehicle (V2V) networks, cellular V2X (C-V2X) networks, and the like) to reliably and dynamically reserve resources for varying packet sizes in both periodic and aperiodic communications. A UE may transmit via resources using slot aggregation according to a link budget, where the UE may transmit or receive data in each slot of multiple consecutive slots. Such transmissions using slot aggregation may increase the likelihood that a receiver (e.g., a UE, a base station) will successfully decode information in at least one of the slots.

A UE may identify a data packet to transmit to another UE (e.g., in sidelink communications) and determine a set of candidate resources for transmission of the data packet based on a resource map. Additionally or alternatively, the UE may select resources from the resource map in accordance with a reservation scheme (e.g., a resource avoidance scheme), which may involve selecting resources that are unoccupied by other UEs in the V2X system. In some examples, the UE may transmit a reservation indication indicating resources to be reserved for subsequent transmissions (e.g., retransmission) and a UE receiving the reservation indication may update a respective resource map. The selected resources may include multiple slots such that the data packet is encoded across the multiple slots.

A method of wireless communications is described. The method may include identifying, by a first wireless device in a V2X system, a data packet for transmission to a second wireless device in the V2X system, the data packet associated with a first latency type, identifying a set of candidate transmission time intervals for transmission of the data packet based on a resource window, where a size of the resource window is based on the first latency type, selecting, from the set of candidate transmission time intervals, a set of transmission time intervals for transmission of the data packet based on the resource window and a set of reserved resources for other wireless devices in the V2X system, and transmitting the data packet to the second wireless device using the set of transmission time intervals.

An apparatus for wireless communications is described. The apparatus may include a processor, memory in electronic communication with the processor, and instructions stored in the memory. The instructions may be executable by the processor to cause the apparatus to identify, by a first wireless device in a V2X system, a data packet for transmission to a second wireless device in the V2X system, the data packet associated with a first latency type, identify a set of candidate transmission time intervals for transmission of the data packet based on a resource window, where a size of the resource window is based on the first latency type, select, from the set of candidate transmission time intervals, a set of transmission time intervals for transmission of the data packet based on the resource window and a set of reserved resources for other wireless devices in the V2X system, and transmit the data packet to the second wireless device using the set of transmission time intervals.

Another apparatus for wireless communications is described. The apparatus may include means for identifying, by a first wireless device in a V2X system, a data packet for transmission to a second wireless device in the V2X system, the data packet associated with a first latency type, identifying a set of candidate transmission time intervals for transmission of the data packet based on a resource window, where a size of the resource window is based on the first latency type, selecting, from the set of candidate transmission time intervals, a set of transmission time intervals for transmission of the data packet based on the resource window and a set of reserved resources for other wireless devices in the V2X system, and transmitting the data packet to the second wireless device using the set of transmission time intervals.

A non-transitory computer-readable medium storing code for wireless communications is described. The code may include instructions executable by a processor to identify, by a first wireless device in a V2X system, a data packet for transmission to a second wireless device in the V2X system, the data packet associated with a first latency type, identify a set of candidate transmission time intervals for transmission of the data packet based on a resource window, where a size of the resource window is based on the first latency type, select, from the set of candidate transmission time intervals, a set of transmission time intervals for transmission of the data packet based on the resource window and a set of reserved resources for other wireless devices in the V2X system, and transmit the data packet to the second wireless device using the set of transmission time intervals.

A method of wireless communications is described. The method may include identifying, by a first wireless device in a V2X system, a data packet for transmission to a second wireless device in the V2X system, transmitting the data packet to the second wireless device via a set of transmission time intervals based on a resource window and a latency type associated with the data packet, selecting, at the time of transmission of the data packet, a set of reserved resources for transmission of a second data packet based at least in part on a resource window and a latency type associated with the second data packet, and transmitting a reservation indication that conveys the set of reserved resources for transmission of the second data packet.

An apparatus for wireless communications is described. The apparatus may include a processor, memory in electronic communication with the processor, and instructions stored in the memory. The instructions may be executable by the processor to cause the apparatus to identify, by a first wireless device in a V2X system, a data packet for transmission to a second wireless device in the V2X system, transmit the data packet to the second wireless device via a set of transmission time intervals based on a resource window and a latency type associated with the data packet, select, at the time of transmission of the data packet, a set of reserved resources for transmission of a second data packet based at least in part on a resource window and a latency type associated with the second data packet, and transmit a reservation indication that conveys the set of reserved resources for transmission of the second data packet.

Another apparatus for wireless communications is described. The apparatus may include means for identifying, by a first wireless device in a V2X system, a data packet for transmission to a second wireless device in the V2X system, transmitting the data packet to the second wireless device via a set of transmission time intervals based on a resource window and a latency type associated with the data packet, selecting, at the time of transmission of the data packet, a set of reserved resources for transmission of a second data packet based at least in part on a resource window and a latency type associated with the second data packet, and transmitting a reservation indication that conveys the set of reserved resources for transmission of the second data packet.

A non-transitory computer-readable medium storing code for wireless communications is described. The code may include instructions executable by a processor to identify, by a first wireless device in a V2X system, a data packet for transmission to a second wireless device in the V2X system, transmit the data packet to the second wireless device via a set of transmission time intervals based on a resource window and a latency type associated with the data packet, select, at the time of transmission of the data packet, a set of reserved resources for transmission of a second data packet based at least in part on a resource window and a latency type associated with the second data packet, and transmit a reservation indication that conveys the set of reserved resources for transmission of the second data packet.

DETAILED DESCRIPTION

Figure 1:
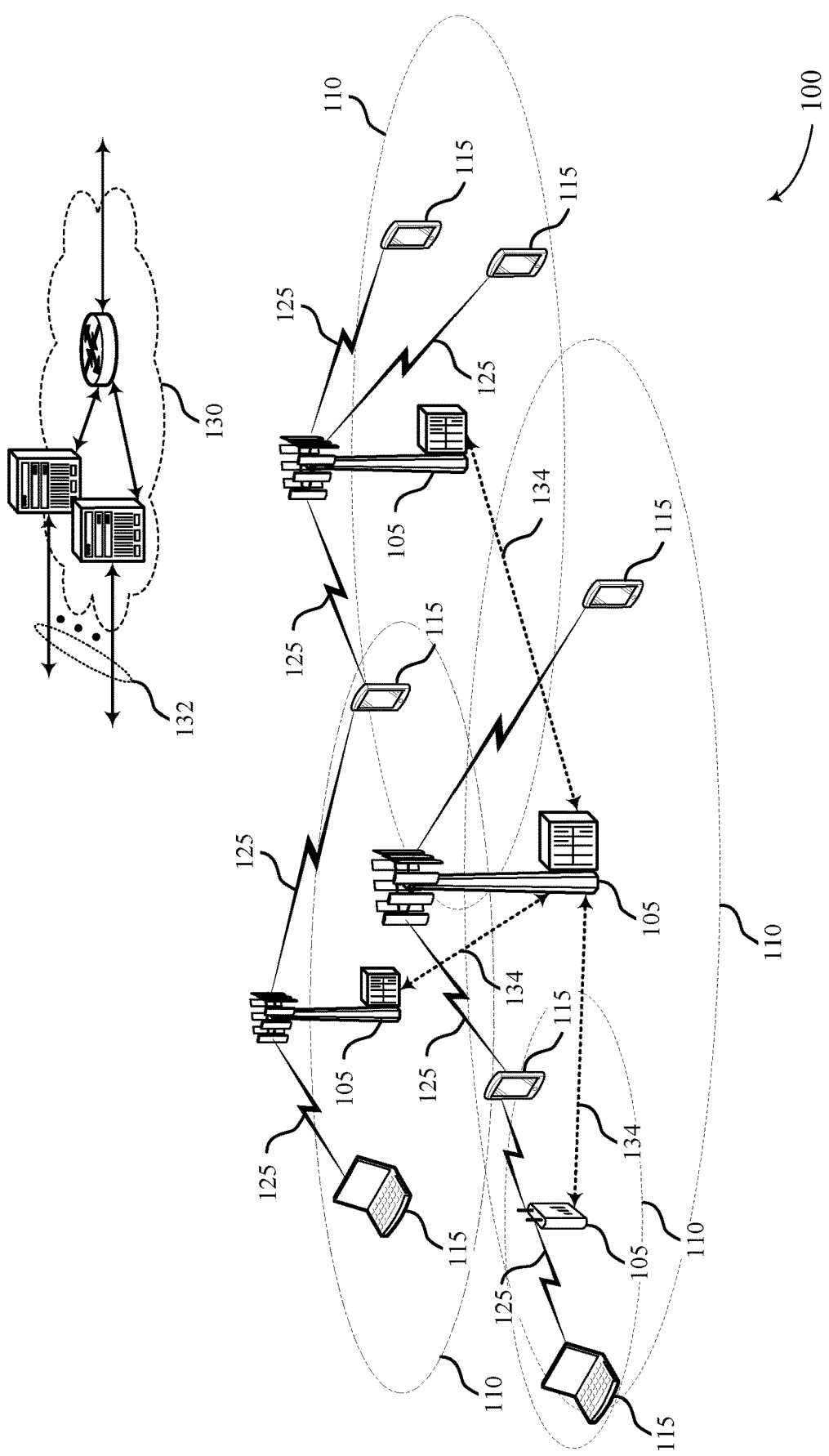
FIG. 1 illustrates an example of a wireless communications system that supports resource reservation techniques for wireless communications in accordance with aspects of the present disclosure.

Wireless communications devices operating in a sidelink communications system (e.g., vehicle-to-everything (V2X) system, a vehicle-to-vehicle (V2V) system, a cellular V2X (C-V2X) system) may communicate with each other using the same frequency band. For example, a user equipment (UE) within a V2X system may attempt to receive communications from each neighboring UE in order to maintain accurate system information (e.g., to receive data for autonomous driving applications). Additionally, a UE in a V2X system may operate according to a half-duplex mode during reception and/or transmission of data, where the UE may be unable to concurrently transmit and receive data. As such, a V2X system may employ a dynamic resource scheduling scheme to utilize available frequency resources and meet scheduling constraints imposed by half duplexing.

For example, a UE within a V2X system may decode control channel transmissions from other UEs within the system in order to obtain information regarding the resources occupied by each respective UE. In some cases, a UE may maintain a resource map containing information regarding occupied resources, and may use this map to select resources for its own transmissions. In some examples, a UE may randomly select resources based on a hierarchy of rules and the resource map. For instance, a UE may select transmission resources that do not coincide with a transmission time interval (TTI) selected by any other UE. If such resources are not available, the UE may select resources that coincide in time with a retransmission of data by another UE (e.g., instead of an initial transmission of data), may select resources that belong to a UE that is sufficiently far away (e.g., based on measurement(s) of received signal(s) from other UEs) from the transmitting UE, may select resources that are unoccupied but coincide in time with another transmission, or may select resources that are occupied by a transmission of a lower priority.

In some cases, a UE may randomly select resources for transmission of a data packet to another UE, or may select resources based on the latency requirement of the data packet. Additionally or alternatively, a UE may select resources for transmission of a data packet based on a priority of the data packet.

After selecting resources, the UE may reserve the selected resources for transmission of the data packet, which may involve the UE transmitting a reservation indication that indicates the selected resources reserved for transmission of the data packet. Other UEs (e.g., neighboring UEs in the V2X system) may receive the reservation indication and maintain (e.g., update) a resource map accordingly. A resource map may be maintained at each UE individually and may be updated as reservation from other UEs are received. According to some aspects, a UE may receive control messages (e.g., transmitted via a control channel) from other UEs in the V2X system. The UE may decode the received control message and determine the resources that are currently reserved by the other UEs. Based on the resources reserved by other UEs, a UE may determine resources to utilize for transmission of a data packet (e.g., based on a resource avoidance mechanism involving random selection or earliest available resources, among other factors).

Particular aspects of the subject matter described herein may be implemented to realize one or more advantages. The described techniques may support improvements in system efficiency such that a device may avoid inefficiently continuing to use resources occupied by another device and instead may use resources that are unoccupied. Additionally or alternatively, the device may use resources that are occupied with low priority data packets or are occupied with data packets that are unlikely to cause interference (e.g., data packets from another device that is a threshold distance away from the device). These techniques may allow a device to transmit data packets with a higher likelihood of successful reception due to reduced risk of interference, which may result in improved network efficiency. Further, a device implementing the described techniques may be associated with fewer retransmissions than a traditional device due to the higher likelihood of successful reception of the data packets of the device, resulting in increased power savings as a result of the fewer retransmissions. As such, supported techniques may include improved network operations and, in some examples, may promote device and network efficiencies, among other benefits.

Aspects of the disclosure are initially described in the context of wireless communications systems. Aspects are then described with respect to resource avoidance mechanism and slot aggregation. Aspects of the disclosure are further illustrated by and described with reference to apparatus diagrams, system diagrams, and flowcharts that relate to resource reservation techniques for wireless communications.

FIG. 1 illustrates an example of a wireless communications system 100 that supports resource reservation techniques for wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., poor signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_S=1/30,720,000$ seconds. Time intervals of a communications resource may be organized according to radio frames each having a duration of 10 milliseconds (ms), where the frame period may be expressed as $T_f=307,200$ $T_S$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In a V2X communications system, sidelink transmissions 135 between UEs 115 may occur within the same frequency band. In some cases, UEs 115 within a V2X system may transmit sidelink data to inform and assist vehicles within a certain vicinity (e.g., for autonomous driving applications). In some examples, sidelink data transmissions 135 may include information such as vehicle intentions (e.g., if a vehicle is to increase or decrease speed) or context notifications (e.g., if a vehicle is an emergency or police vehicle), as well as information regarding the current state of the vehicle (e.g., current speed and/or location). In some V2X systems, a UE 115 may experience a half-duplex effect, where the UE 115 may be unable to transmit and receive data during the same time period. Moreover, each UE 115 may, in order to maintain accurate system information, both transmit its own data and attempt to receive each data packet from each neighboring UE 115. As such, a UE 115 may employ various resource scheduling schemes to avoid collisions with sidelink transmissions from other UEs 115.

In some cases, a UE 115 may use a semi-persistent scheduling scheme for transmitting V2X communications, where communication resources may be defined by a certain periodicity (e.g., 20 ms, 50 ms, 100 ms, etc.). Additionally or alternatively, a UE 115 may employ aperiodic resource scheduling and may additionally vary data packet sizes with each transmission. For example, a UE 115 may use a dynamic resource reservation scheme to utilize available resources and thereby ensure performance metrics are met (e.g., latency requirements). In some cases, the frequency allocation size may be limited to ensure a UE 115 meets a link budget. For example, a receiving device may receive a higher amount of energy per bit of data if a transmitting device transmits using multiple time slots (e.g., continuous or discontinuous slots) for transmission instead of using multiple frequency resources.

In one example, of a dynamic resource scheduling scheme (e.g., a resource avoidance mechanism), a UE 115 may determine which resources are occupied by surrounding UEs 115, may randomly select resources based on an interference avoidance scheme, and may transmit using the selected resources. In some cases, a UE 115 may select and reserve resources for transmission of data packet based on available resources (e.g., resources unoccupied by other UEs 115 in the V2X system), a priority associated with the data packet, or a latency associated with the data packet, or a combination thereof In some examples, the UE 115 may maintain and reference a resource map to utilize when selecting resources for transmission of a data packet. The resource map may indicate resources reserved for use by other UEs 115 in the V2X system, and the reserved resources may be identified through control message or reservation indications transmitted by the other UEs 115. In some cases, the UE may utilize a resource window (e.g., a window of time-frequency resources) to determine resources available for transmission of the data packet by identifying time-frequency resources (e.g., TTIs) within the resource window available for use by the UE 115 or occupied by other UEs 115. Selection of the resources within the window may be based on priority of the data packet or of the traffic associated with the resources reserved by other UEs 115. Additionally or alternatively, selection of the resources may be based on earliest available resources or TTIs that are unoccupied. Further, multiple TTIs or slots within the resource window may be selected for transmission of the data packet, and the data packet may be encoded across the multiple TTIs according to a slot aggregation scheme.

After selecting resources for transmission of the data packet, the UE 115 may transmit a reservation indication to reserve resources for transmission of the data packet. In some cases, the reservation indication may indicate resources reserved for subsequent transmissions (e.g., retransmission of the data packet or any additional data transmissions). In some cases, a reservation indication may indicate reserved resources for only the next data transmission, or the reservation indication may indicate reserved resources for multiple future transmissions.

Figure 2:
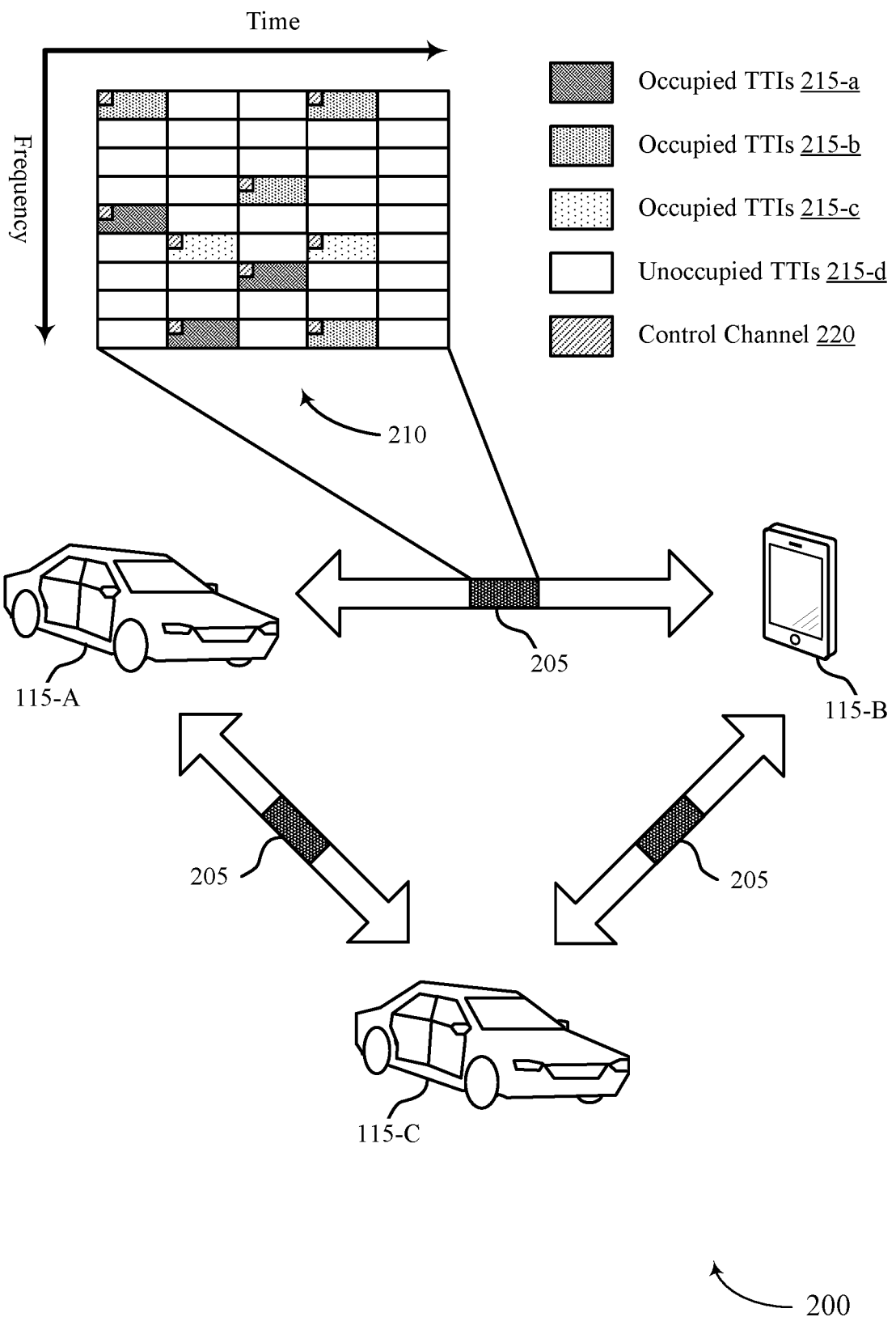
FIG. 2 illustrates an example of a wireless communications system that supports resource reservation techniques for wireless communications in accordance with aspects of the present disclosure.

FIG. 2 illustrates an example of a wireless communications system 200 that supports resource reservation techniques for wireless communications in accordance with aspects of the present disclosure. In some examples, wireless communications system 200 may implement aspects of wireless communications system 100. In some examples, wireless communications system 200 may implement aspects of wireless communications system 100 and may include UEs 115-a, 115-b, and 115-c, which may be examples of UE 115 described with reference to FIG. 1. In some cases, UEs 115-a, 115-b, and 115-c may communicate with each other within a V2X system (e.g., using sidelink communications 205) and may employ a resource scheduling interference avoidance scheme to dynamically select and use transmission resources.

According to some aspects, UE 115-a may attempt to decode sidelink transmissions 205 from UEs 115-b and 115-c in order to maintain accurate system information (vehicle data, scheduled resources, etc.) and construct a resource map 210. In some cases, sidelink transmissions 205 may include a control channel 220, which UE 115-a may decode to determine which resources within the V2X frequency band are reserved or occupied by UEs 115-b and 115-c, respectively. In some examples, transmissions on a control channel 220 may indicate a length of a transmission (e.g., initial transmission length and/or total transmission length), which may, in some cases, remain the same for any subsequent transmission (e.g., retransmission). Additionally, UE 115-a may use current and previous reservation information to construct a resource map 210, which may indicate resources (e.g., TTIs 215-a, 215-b, and 215-c) that are occupied by UEs 115-a, 115-b, and 115-c, respectively, and may also indicate unoccupied resources (e.g., unoccupied TTIs 215-d). In some cases, UE 115-a may use resource map 210 to select resources (e.g., one or more TTIs 215) to use for its own sidelink transmissions 205, which may also be selected based on an interference avoidance scheme.

Transmissions on a control channel 220 from UE 115-a may include a reservation indication to reserve resources for future transmissions. In some cases, a first resource reservation for a data packet may indicate resources to be used for a following transmission, such as a retransmission and/or a transmission of subsequent data corresponding to the same data packet and in some examples, a resource reservation subsequent to the first resource reservation for a data packet may only indicate resources reserved for retransmission. In some cases, UE 115-a may indicate resource reservations using a slot index and a subchannel index. The slot index may include a defined number of bits (e.g., six bits), a subchannel index may include a different defined number of bits (e.g., four bits), and the overall reservation indication may contain a total of the slot index bits and subchannel index bits (e.g., 10 bits). In some examples, the slot index may indicate a reservation for a slot (e.g., a TTI 215) corresponding to a specified number of slots following a control channel 220 of a transmission. Additionally or alternatively, the slot index may indicate a reservation for a slot (e.g., a TTI 215) corresponding to a specified number of slots following the last slot of the transmission. The subchannel index may indicate a reservation for a subchannel corresponding to a specified number of subchannels from the start or from the end of a subchannel resource pool. In some cases, the subchannel may be defined as a given amount (e.g., minimum or maximum) of a frequency spectrum that a transmission resource (e.g., TTI 215) may occupy.

UE 115-a may begin selecting transmission resources by defining a window for resource selection within the V2X transmission resources (e.g., using resource map 210). For example, UE 115-a may define a window based on whether a transmission is an initial transmission or a retransmission, based on latency requirements of a data packet, or based on a soft buffer requirement of UE 115-a (e.g., UE 115-a may only be able to store data for up to 16 ms). Within the defined window, UE 115-a may select one or more TTIs 215 for transmission by identifying one or more candidate TTIs 215. For example, UE 115-a may use resource map 210 to identify TTIs 215-b (e.g., resources occupied by UE 115-b) and TTIs 215-c (e.g., resources occupied by UE 115-c) and may determine to exclude these resources from selection based on the resources being occupied. Additionally or alternatively, UE 115-a may identify candidate TTIs 215 based on a distance between UE 115-a and either UE 115-b or 115-c. For example, if UE 115-c has reserved TTIs 215-c, but UE 115-c is beyond a threshold distance from UE 115-a (e.g., as indicated in a transmission on a control channel 220), UE 115-a may identify TTIs 215-c as candidate resources. In some cases, UE 115-a may also identify candidate TTIs 215 based on a latency requirement of a data packet to be sent. For example, UE 115-a may have a latency threshold requirement and may identify TTIs 215 that satisfy the requirement.

In some examples, UE 115-a may select resources based on a hierarchy of rules (e.g., an interference avoidance scheme) and candidate resources identified using resource map 210. In some cases, UE 115-a may first attempt to randomly select an unoccupied TTI 215-d that may not coincide in time with any other reserved TTI 215-a, 215-b, or 215-c (e.g., in order to avoid half duplex effects). For example, UE 115-a may select an unoccupied TTI 215-d from the last (e.g., latest) column (e.g., the right-most column) of resource map 210 or from another column that may include only unoccupied TTIs 215-d. Additionally or alternatively, an earlier unoccupied TTI 215-d may be preferred over a later unoccupied TTI 215-d (e.g., instead of the selection process being completely random). For example, in some cases, UE 115-a may select the earliest unoccupied TTI 215-d that does not coincide in time with another TTI 215-d.

In some cases, UE 115-a may be unable to transmit on or unable to find an unoccupied TTI 215-d that does not coincide in time with other transmissions. Therefore, UE 115-a may proceed to select unoccupied TTIs 215-d that may be multiplexed in frequency with retransmissions from UE 115-b or 115-c, where the retransmissions may correspond to original transmissions that UE 115-a may have successfully decoded. For example, UE 115-a may determine (e.g., from decoding a control channel 220) that TTIs 215-b and 215-c within the second-to-last column of resource map 210 are retransmissions, and may further determine that UE 115-a has already successfully decoded the original transmissions corresponding to the retransmissions. As such, UE 115-a may proceed to select an unoccupied TTI 215-d within the second-to-last column of resource map 210.

Additionally or alternatively, UE 115-a may be unable to transmit on or unable to find an unoccupied TTI 215-d after attempting the above techniques. Therefore, UE 115-a may determine to randomly select any unoccupied TTI 215-d of the appropriate size for its own transmissions. Additionally or alternatively, UE 115-a may determine to preempt resources of a lower priority, where the resource priority may be determined from decoding a control channel 220. For example, UE 115-a may determine to preempt one or more TTIs 215-b for its own transmissions and may indicate this intention in a control channel 220 associated with the transmissions. As such, UE 115-b may decode the control channel 220 transmitted by UE 115-a (e.g., as part of constructing a resource map 210), may determine that UE 115-a is preempting resources on one or more TTIs 215-b, and may release the preempted resources. In some cases, UE 115-a may identify lower priority resources for preemption based on a signal strength (e.g., a received signal strength indicator (RSSI) or a reference signal received power (RSRP)) of the transmissions corresponding to the resources. For example, UE 115-a may identify transmissions with a lower signal strength as lower priority (e.g., because the low signal strength may indicate that the transmitting device may be located beyond a certain distance from UE 115-a).

In some cases, lower priority TTIs 215-b or 215-c may not be available for UE 115-a to preempt (e.g., within the determined window) and therefore UE 115-a may revise the distance metric used to identify candidate resources. For example, as UE 115-a decodes transmissions on control channels 220 from UEs 115-b and 115-c (e.g., as a part of constructing resource map 210), UE 115-a may determine that either UE 115-b or 115-c is transmitting from beyond a specified distance (e.g., beyond the revised distance metric). As such, UE 115-a may determine to include candidate resources transmitted from beyond the revised distance metric when selecting resources. Additionally or alternatively, UE 115-a may relax a criteria for candidate resources such as a signal strength (e.g., an RSSI or an RSRP), such that UE 115-a may consider occupied TTIs 215-b or 215-c with a signal strength below a certain threshold (e.g., which may indicate a transmission location beyond a certain distance from UE 115-a) as a candidate resource for transmitting data. In some cases, UE 115-a may extend its window for resource selection (e.g., using a configuration for UE 115-a) based on whether soft buffer bits may be available or based on latency constraints (e.g., latency constraints may not be rigid). After adjusting one or more criteria (distance metric, signal strength, window size, etc.), UE 115-a may determine to repeat the steps described herein for resource selection using an interference avoidance scheme.

In some cases, TTIs 215-a, 215-b, and 215-c may contain resources dedicated to HARQ feedback, which all other UEs 115 may decode as part of constructing a resource map 210. In some examples, a transmitting UE 115-a may not receive any negative acknowledgement (NAK) feedback from either UE 115-b or 115-c regarding a sidelink transmission 205 (e.g., corresponding to one or more TTIs 215-a) and may therefore determine to release any TTIs 215-a reserved for retransmission. As such, UE 115-a may indicate (e.g., via a control channel 220) that it has released the retransmission resources and UEs 115-b and 115-c may update their respective resource maps 210 accordingly. Additionally or alternatively, UE 115-a may receive a NAK corresponding to the sidelink transmission 205 and may therefore determine to continue retransmitting on any reserved retransmission resources (e.g., resource maps 210 may therefore remain unchanged). In some examples, UE 115-a may be unable to process a NAK (e.g., due to collisions or results of the half duplex constraint) and may therefore determine to continue to transmit on the resources reserved for retransmission. Additionally or alternatively, if UE 115-a is unable to process a NAK but determines that a received power level is below a given threshold (e.g., indicating that a UE 115 transmitting a NAK may be beyond a certain distance), UE 115-a may determine to release its retransmission resources. In some cases, the action to be taken by a UE 115 may be a part of the configuration of said UE 115 (e.g., based on UE capability).

In some examples of V2X communications system, UE 115-a may only select frequency resources (e.g., subchannels) on predefined subchannel indices, and may additionally only select frequency resources according to a priority (e.g., in order to minimize collisions among data packets employing FDM). For example, data packets within a 20 MHz band that occupy 10 MHz each may only have two subchannel indices from which to choose resources, and each 10 MHz subchannel may be assigned an equal priority. Additionally or alternatively, data packets within a 20 MHz band that occupy 5 MHz each may have four subchannel indices from which to choose resources. In this example, subchannels corresponding to 0 MHz and 10 MHz may have a highest priority for selection, while subchannels corresponding to 5 MHz and 15 MHz may have a secondary priority.

According to some aspects, a UE 115 having a data packet for transmission to another wireless device (UE 115) may select multiple TTIs or slots for transmission of the data packet according to a slot aggregation scheme. For example, a data packet identified by a first UE 115 for transmission to a second UE 115 may be encoded across multiple slots or TTIs, which may be selected according to a resource avoidance mechanism as described herein.

Figure 3:
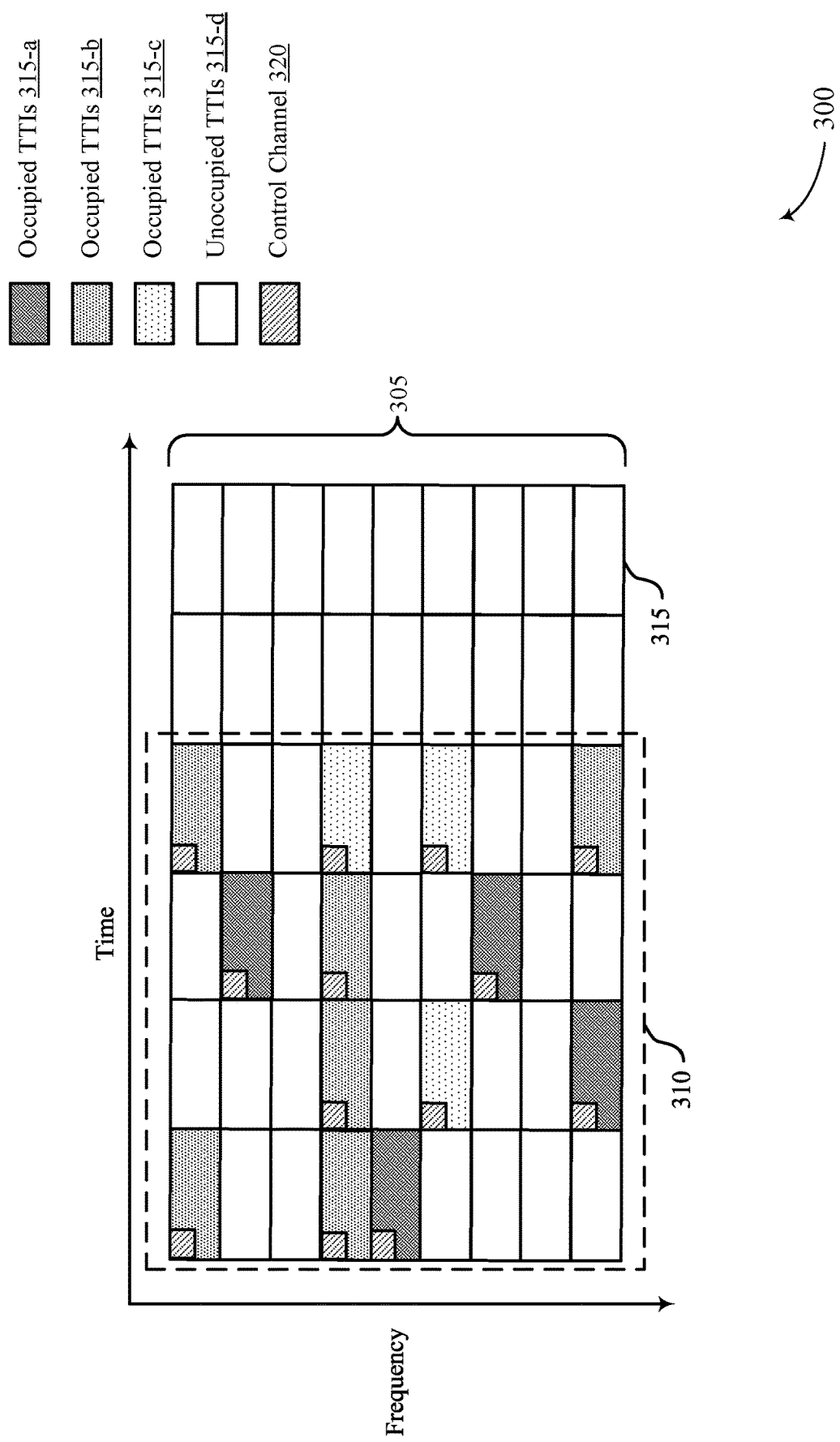
FIG. 3 illustrates an example of a resource avoidance mechanism that supports resource reservation techniques for wireless communications in accordance with aspects of the present disclosure.

FIG. 3 illustrates an example of a resource avoidance mechanism 300 that supports resource reservation techniques for wireless communications in accordance with aspects of the present disclosure. In some examples, resource avoidance mechanism 300 may implement aspects of wireless communications systems 100 or 200, or may be implemented by a UE 115 (or other wireless device in a V2X system), as described herein.

Resource avoidance mechanism 300 may include a resource map 305, which may be maintained by one or more UEs in the V2X system. For example, each UE in a V2X system may maintain a respective resource map 305, which may indicate resources occupied, unoccupied, or reserved by other UEs in the V2X system. The resource map 305 may include multiple TTIs 315 (slots, mini-slots, symbols, etc.) and may span a portion of a frequency band (a channel, a carrier, a subcarrier, etc.), as shown. The resource map 305 may include occupied TTIs 315-a, 315-b, and 315-c, which may be occupied by other UEs in the V2X system. The resource map may also include unoccupied TTIs 315-d, which may not be reserved by other UEs in the V2X system or, in some cases, may be reserved by other UEs in the V2X system having lower priority traffic for transmission.

The resource map 305 may be generated at a UE in the V2X system based on control information or reservation information from other UEs in the V2X. For instance, a UE may receive one or more control messages from another UE, which may be decoded by the UE to determine the resources reserved by the other UE. Additionally or alternatively, the UE may receive a reservation indication from another UE, which may explicitly indicate the resource reserved by the other UE. In some examples, the UE may receive the reservation indication via a control channel 320. As additional signals are received, the UE may update the resource map 305 based on the reserved resources determined from the received signals.

Figure 4:
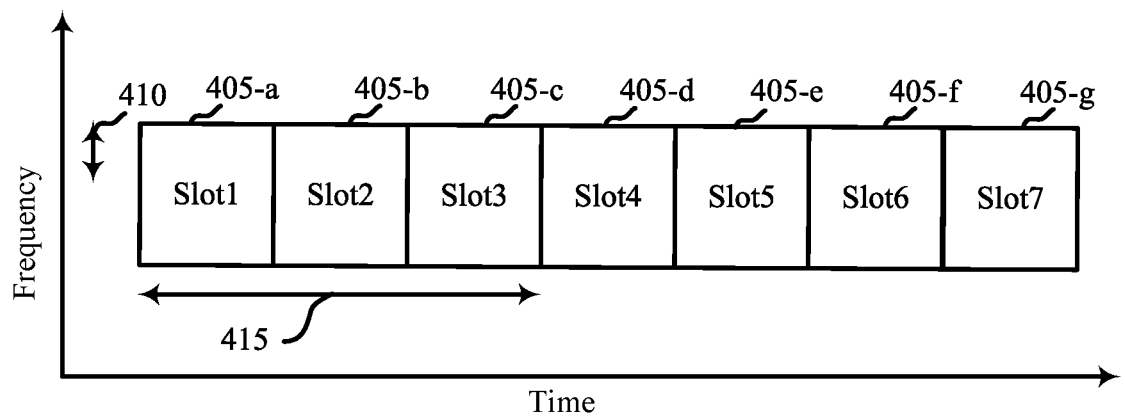
FIG. 4 illustrates an example of slot aggregation that supports resource reservation techniques for wireless communications in accordance with aspects of the present disclosure.

In some cases, a UE may select resources from the resource map 305 for transmission of a data packet based on a resource window 310. The resource window 310 may span a number of TTIs 315 in time, a number of subcarriers in the frequency domain, or a combination. For instance, the resource window 310 may span 4 TTIs 315, as shown in FIG. 4. A UE may select or determine a size of the resource window 310 (e.g., based on a configuration for the UE) in accordance with resource avoidance mechanism 300. In some examples, a UE may select a size for resource window 310 based on whether the data packet for transmission is an initial transmission or a retransmission of a data packet. Additionally or alternatively, a UE may select a size for resource window 310 based on a latency of the data packet to be transmitted or based on UE capabilities (e.g., a soft buffer of a UE). For example, a UE may have soft buffer configured to store 16 ms of data and a size for resource window 310 may be selected to be less than 16 ms so that buffered data is not lost prior to transmission.

In some cases, in selecting resources for transmission, a UE may identify a set of TTIs 315 within resource window 310 which may include one or more candidate TTIs (e.g., unoccupied TTIs 315-d). In some cases, a UE may identify TTIs 315 reserved by other UEs (e.g., TTIs 315-a, 315-b, or 315-c) and may exclude these reserved resources from the selection process. In other examples, a UE may identify candidate TTIs 315 based on the distance from another transmitting UE. For instance, if another UE has reserved resources and the UE exceeds a threshold distance from the UE, the reserved resources may be candidates. A UE may also identify candidate TTIs 315 based on a latency requirement of the data packet to be transmitted (e.g., the data packet may be associated with a latency requirement and the UE may identify candidate TTIs 315 that satisfy the latency requirement).

According to resource avoidance mechanism 300, selection of TTIs for transmission may include randomly selecting a set of unoccupied TTIs 315-d within resource map 310 (e.g., such that the selected TTIs 315 mitigate constraints caused by half-duplex mode operation). In other cases, an earlier TTI 315 may be preferred over a later TTI 315 (e.g., the earliest unoccupied TTI 315-d may be selected).

In some aspects, selecting a set of TTIs 315 for transmissions may include selecting unoccupied resources in a TTI 315 that are multiplexed in frequency with retransmissions from other UEs. For example, a UE may select an unoccupied resource in an occupied TTI 315-c if at least a portion of the occupied TTI 315-c is reserved for a retransmission from another UE. This may occur when a retransmission from another UE corresponds to data packets that have already been decoded.

Selection of a set of TTIs 315 transmissions may involve selecting unoccupied resources (e.g., unoccupied TTIs 315-d) based on a size of the data packet (e.g., a UE may select an unoccupied TTI 315-d or resources of occupied TTIs 315-a, 315-b, or 315-c corresponding to a size of the data packet. In some cases, a UE may select a set of TTIs 315 for transmission of a data packet by selecting occupied TTIs 315-a, 315-b, or 315-c that may be reserved by other UEs for transmission of traffic having a lower priority than the data packet to be transmitted by the UE. For example, an occupied TTI 315-a may have no unoccupied resources available for reservation and the UE may select resources of occupied TTI 315-a that are reserved for lower priority traffic than the data packet being transmitted by the UE. Additionally or alternatively, a UE may preempt the reserved resources associated with lower priority traffic through transmission of a reservation indication, for example. UEs that receive such a reservation indication may yield the resources to the UE for transmission of the higher priority packet. In some cases, a UE may preempt resources reserved by low priority traffic based on signal strength measurements received by the UE associated with the low priority traffic. For instance, a UE may measure an RSSI or an RSRP of a reservation indication transmitted by another UE and determine that the signal strength is lower than other reservation indications (or may fall below a threshold signal strength). The UE may then choose to preempt the reserved resource indicated by such a reservation indication.

Other aspects of resource avoidance mechanism may involve revising a distance metric threshold. For example, a UE may exclude candidate TTIs 315 from selection if a distance metric threshold is exceeded and the UE may revise the distance metric threshold to identify more candidate TTIs 315 (e.g., the UE may extend a size of a distance metric threshold which may result in exclusion of fewer TTIs from candidacy). Additionally or alternatively, a UE may revise a signal strength threshold (e.g., an RSSI or an RSRP threshold value) for signals received from other UEs in order to include additional TTIs in the selection. In some examples, the size of the resource window 310 may be extended to include more candidate TTIs within resource map 305 (e.g., a size of resource window 310 may be extended based on soft buffer requirements of a UE or latency requirements).

In some cases, a UE may be unable to identify any TTIs 315 for selection. In such cases, the UE may drop the data packet to be transmitted.

A UE may transmit a reservation indication to indicate reserved resources, which may include a slot index and a sub-channel index (e.g., indicated as separate values). For example, a reservation indication may include a value N (e.g., 1, 2, 4, 5, or 6 bits) that represents a slot index (e.g., 1, 3, 4, 5, or 6 bits). The slot index may indicate the number of slots after an initial transmission where a reserved slot is located. For example, a slot index may be a value of two and indicate that a reserved slot is two slots from an initial transmission. In some examples, a reserved slot may be a last slot of an initial transmission. The sub-channel index may indicate a number of subchannels from the start of a resource pool where a reserved subchannel is located. For example, a sub-channel index may be a value of two and indicate that a reserved sub-channel is two sub-channels from the start of a resource pool. In other cases, a sub-channel index may be a value indicating how many sub-channels from the end of a resource pool a reserved sub-channel is located. For example, a sub-channel index may be a value of two and indicate that a reserved sub-channel is two sub-channels from the end of a resource pool.

FIG. 4 illustrates an example of slot aggregation 400 that supports resource reservation techniques for wireless communications in accordance with aspects of the present disclosure. In some examples, slot aggregation 400 may implement aspects of wireless communications systems 100 or 200.

As described in FIG. 3, a UE may select and reserve resources for transmission in a wireless communications system (e.g., a V2X system). In some cases, the UE may select resources for transmission of a data packet according to slot aggregation 400. For example, a data packet identified for transmission to another UE may be encoded across multiple slots 405 or TTIs. The multiple slots 405 may be selected based on a resource avoidance mechanism as described herein. As shown in FIG. 4, a data packet may be encoded across 3 slots: slot 405-*a*, slot 405-*b*, and slot 405-*c*.

A data packet may be transmitted in a slot 405 with a given frequency allocation 410 (e.g., in resources of a slot 405 occupied by another UE). For example, a packet may utilize a frequency allocation in a frequency spectrum (e.g., 5 MHz allocation in a 20 MHz spectrum). In some cases, a packet may be transmitted across aggregated slots 405 (e.g., slot 405-*a*, slot 405-*b*, and slot 405-*c*) and across frequency allocation 210 across each of the slots 405 (e.g., a packet may utilize a frequency allocation 210 in each of slot 405-*a*, slot 405-*b*, and slot 405-*c*). In such cases, a distance at which the packet may be successfully decoded (e.g., based on a link budget) may remain relatively unchanged. In other cases, a frequency allocation 410 may be different across slots. For example, a packet may be aggregated across multiple slots 405, each of which may have a different frequency allocation 410.

Figure 5:
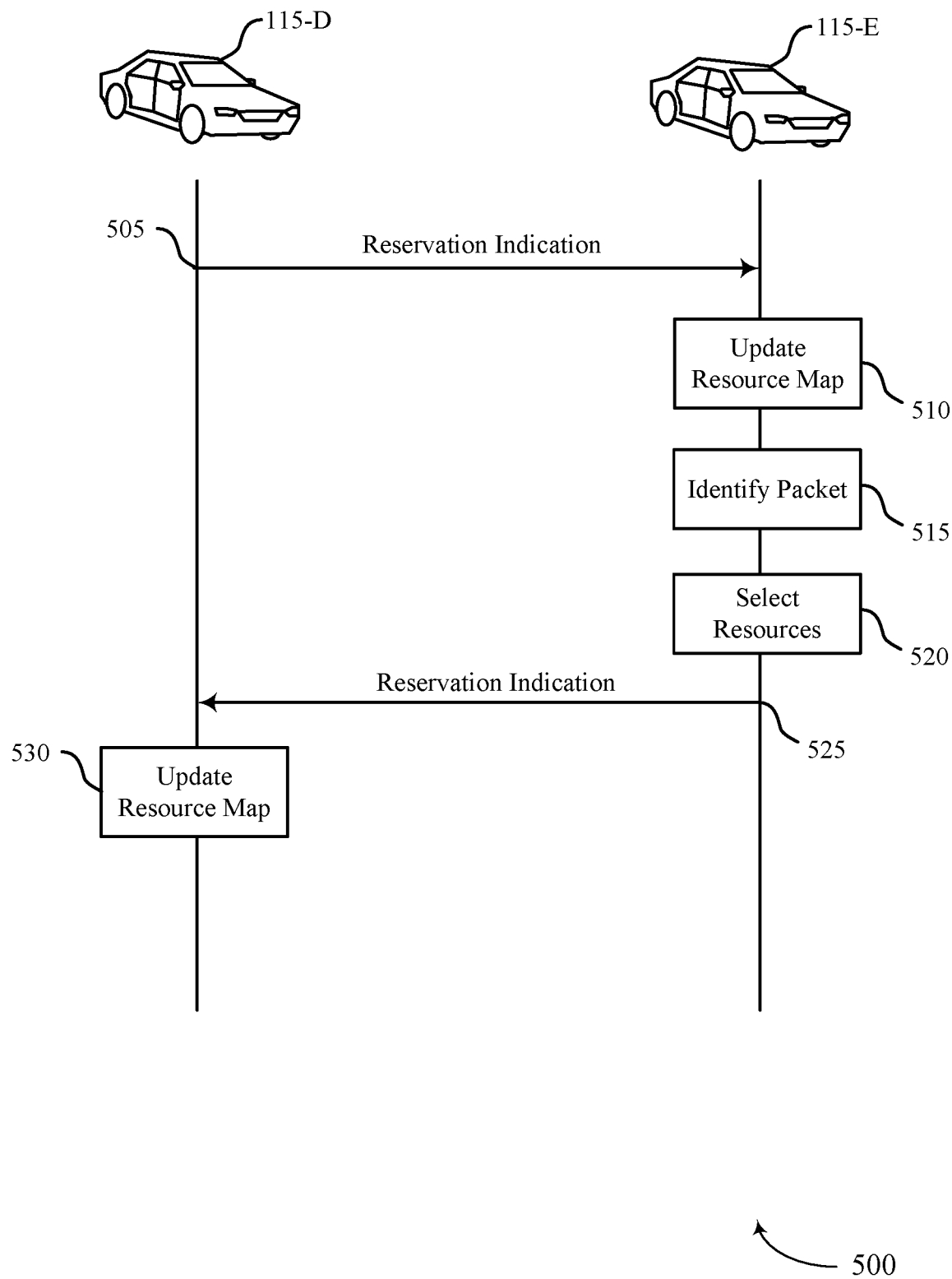
FIG. 5 illustrates an example of a process flow that supports resource reservation techniques for wireless communications in accordance with aspects of the present disclosure.

FIG. 5 illustrates an example of a process flow 500 that supports resource reservation techniques for wireless communications in accordance with aspects of the present disclosure. In some examples, process flow 500 may implement aspects of wireless communications systems 100 or 200. Process flow 500 may be implemented by UE 115-*a* and examples of UEs 115, as described herein.

At 505, UE 115-*d* may transmit, to UE 115-*e*, a control transmission containing a reservation indication. A reservation indication may be an example of a reservation indication described in FIG. 3. In some cases, a reservation indication may be transmitted over a resource being reserved by UE 115-*d*.

At 510, UE 115-*e* may update a resource map based on the reservation indication received from UE 115-*d*. A resource map may be an example of resource map 305 described in FIG. 3. For example, UE 115-*e* may decode the control transmission containing the reservation indication. UE 115-*e* may update the resource map accordingly.

At 515, UE 115-*e* may identify a packet to transmit. In some cases, UE 115-*e* may identify a packet for transmission and may select a window for resource selection. A window for resource selection may be an example of window 310 described in FIG. 3.

At 520, UE 115-*e* may select resources in accordance with a resource avoidance mechanism. The resource avoidance mechanism may be an example of resource avoidance mechanism 300 described in FIG. 3. In some examples, UE 115-*e* may select resources with slot aggregation. Slot aggregation may be an example of slot aggregation 400 described in FIG. 4.

At 525, UE 115-*e* may transmit, to UE 115-*d*, a control transmission containing a reservation indication. A reservation indication may be another example of a reservation indication described in FIG. 3. In some cases, a reservation indication may be transmitted over a resource being reserved by UE 115-*e*. In some cases, a resource reservation may indicate resources to be used for a next transmission. For example, a retransmission may indicate a reservation for any additional retransmissions. In some cases, a retransmission may indicate reserved resources for only a next future transmission. In other cases, a retransmission may indicate reserved resources for multiple future transmissions.

At 530, UE 115-*d* may update a resource map based on the reservation indication received from UE 115-*e*. A resource map may be an example of resource map 305 described in FIG. 3. For example, UE 115-*e* may decode the control transmission containing the reservation indication. UE 115-*e* may update the resource map accordingly.

Figure 6:
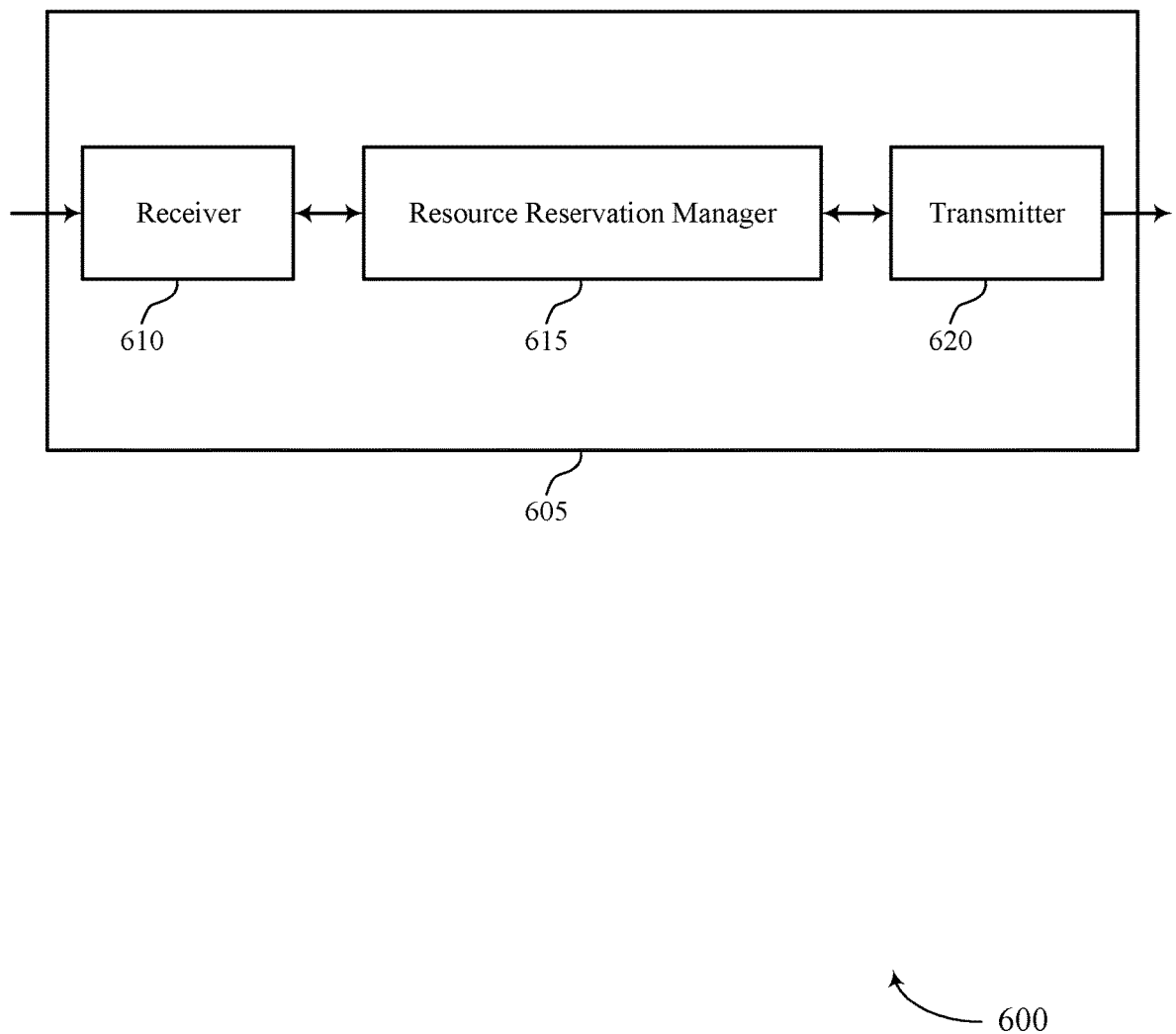
FIGS. 6 and 7 show block diagrams of devices that support resource reservation techniques for wireless communications in accordance with aspects of the present disclosure.

FIG. 6 shows a block diagram 600 of a device 605 that supports resource reservation techniques for wireless communications in accordance with aspects of the present disclosure. The device 605 may be an example of aspects of a UE 115 as described herein. The device 605 may include a receiver 610, a resource reservation manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource reservation techniques for wireless communications, etc.). Information may be passed on to other components of the device 605. The receiver 610 may be an example of aspects of the transceiver 920 described with reference to FIG. 9. The receiver 610 may utilize a single antenna or a set of antennas.

The resource reservation manager 615 may identify, by a first wireless device in a V2X system, a data packet for transmission to a second wireless device in the V2X system, where the data packet is associated with a first latency type, and identify a set of candidate TTIs for transmission of the data packet based on a resource window, where a size of the resource window is based on the first latency type. The resource reservation manager 615 may select, from the set of candidate TTIs, a set of TTIs for transmission of the data packet based on the resource window and a set of reserved resources for other wireless devices in the V2X system, and transmit the data packet to the second wireless device using the set of TTIs.

The resource reservation manager 615 may also identify, by a first wireless device in a V2X system, a data packet for transmission to a second wireless device in the V2X system, transmit the data packet to the second wireless device via a set of transmission time intervals based on a resource window and a latency type associated with the data packet, select, at the time of transmission of the data packet, a set of reserved resources for transmission of a second data packet based at least in part on a resource window and a latency type associated with the second data packet, and transmit a reservation indication that conveys the set of reserved resources for transmission of the second data packet. The resource reservation manager 615 may be an example of aspects of the resource reservation manager 910 described herein.

The resource reservation manager 615, or its sub-components, may be implemented in hardware, code (e.g., software or firmware) executed by a processor, or any combination thereof. If implemented in code executed by a processor, the functions of the resource reservation manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The resource reservation manager 615, or its sub-components, may be physically located at various positions, including being distributed such that portions of functions are implemented at different physical locations by one or more physical components. In some examples, the resource reservation manager 615, or its sub-components, may be a separate and distinct component in accordance with various aspects of the present disclosure. In some examples, the resource reservation manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow device 605 to identify unoccupied resources, or occupied resources with low priority data packets or data packets unlikely to cause interference, and to transmit data packets using those identified resources. In some examples, this may enable device 605 to reduce communication errors (e.g., caused by interference with another data packet using the same resources). Further, device 605 may reduce a number of retransmissions of the data packets that may have otherwise been necessary without such resource coordination. In accordance with such techniques, the device 605 may feature increased power savings and improved battery life.

Additionally, another implementation may enable device 605 to select resources (e.g., unoccupied, occupied with lower priority data packets, or occupied with data packets unlikely to cause interference) based on the type of data packets device 605 may be transmitting. For instance, a data packet for transmission may be associated with a latency requirement and/or a priority and device 605 may select a resource based on the latency requirement and/or priority of the data packet. Due to the resource coordination described herein, this implementation may enable flexible resource selection in which the device 605 may transmit the data packet according to its latency requirement and/or priority relative to other data packets. This may result in lower latency for data packets associated with a strict latency requirement and/or higher priority packets.

Figure 7:
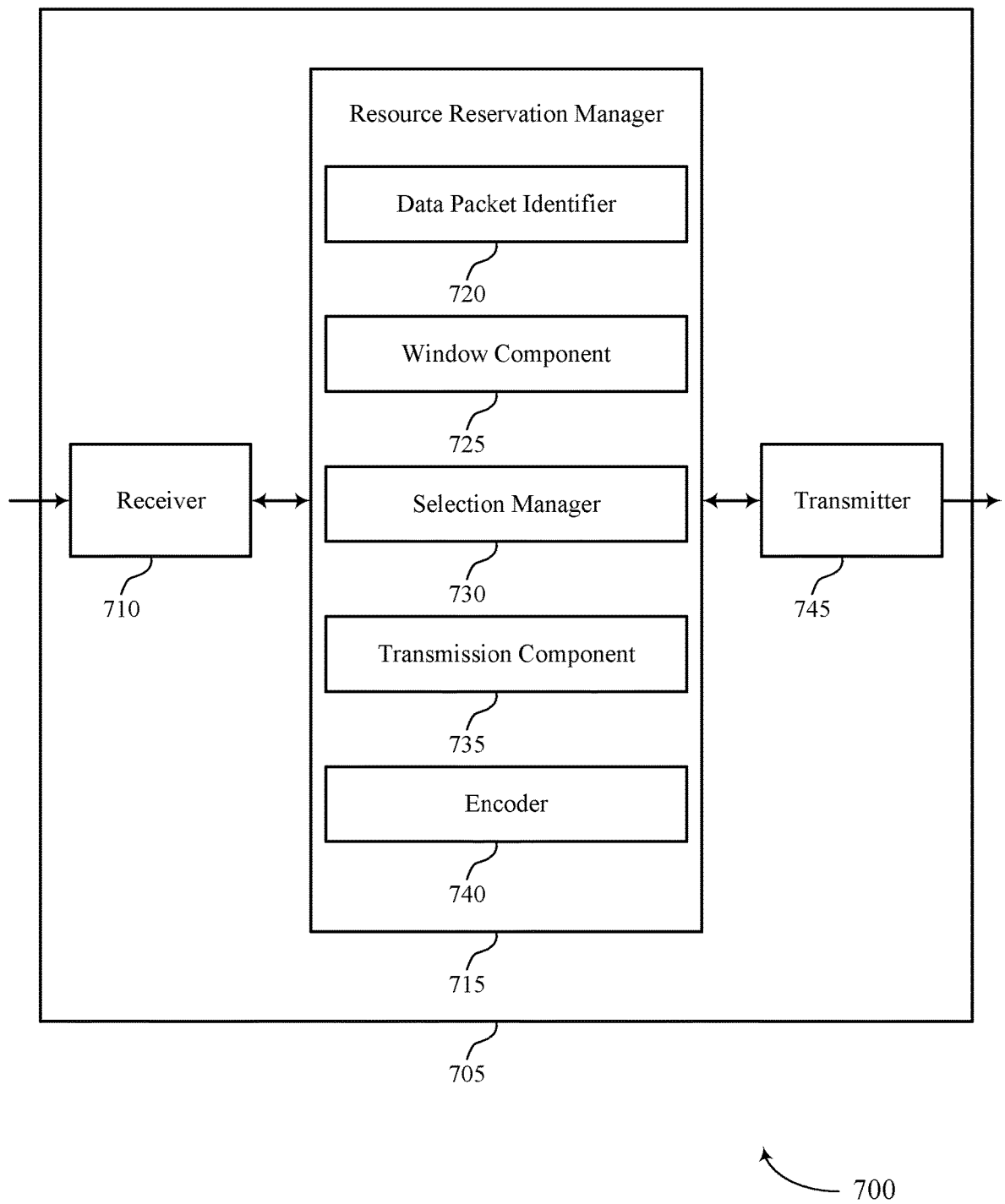

FIG. 7 shows a block diagram 700 of a device 705 that supports resource reservation techniques for wireless communications in accordance with aspects of the present disclosure. The device 705 may be an example of aspects of a device 605, or a UE 115 as described herein. The device 705 may include a receiver 710, a resource reservation manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to resource reservation techniques for wireless communications, etc.). Information may be passed on to other components of the device 705. The receiver 710 may be an example of aspects of the transceiver 920 described with reference to FIG. 9. The receiver 710 may utilize a single antenna or a set of antennas.

The resource reservation manager 715 may be an example of aspects of the resource reservation manager 615 as described herein. The resource reservation manager 715 may include a data packet identifier 720, a window component 725, a selection manager 730, a transmission component 735, and an encoder 740. The resource reservation manager 715 may be an example of aspects of the resource reservation manager 910 described herein.

The data packet identifier 720 may identify, by a first wireless device in a V2X system, a data packet for transmission to a second wireless device in the V2X system, where the data packet may be associated with a first latency type.

The window component 725 may identify a set of candidate TTIs for transmission of the data packet based on a resource window, where a size of the resource window may be based on the first latency type.

The selection manager 730 may select, from the set of candidate TTIs, a set of TTIs for transmission of the data packet based on the resource window and a set of reserved resources for other wireless devices in the V2X system.

The transmission component 735 may transmit the data packet to the second wireless device using the set of TTIs.

The data packet identifier 720 may identify, by a first wireless device in a V2X system, a data packet for transmission to a second wireless device in the V2X system.

The encoder 740 may encode the data packet across a set of TTIs.

The transmission component 735 may transmit the encoded data packet to the second wireless device via the set of TTIs based on a resource window and a latency type associated with the data packet, where a set of reserved resources for transmission of a second data packet is selected at a time of transmission of the data packet.

The transmitter 745 may transmit signals generated by other components of the device 705. In some examples, the transmitter 745 may be collocated with a receiver 710 in a transceiver. For example, the transmitter 745 may be an example of aspects of the transceiver 920 described with reference to FIG. 9. The transmitter 745 may utilize a single antenna or a set of antennas.

Figure 8:
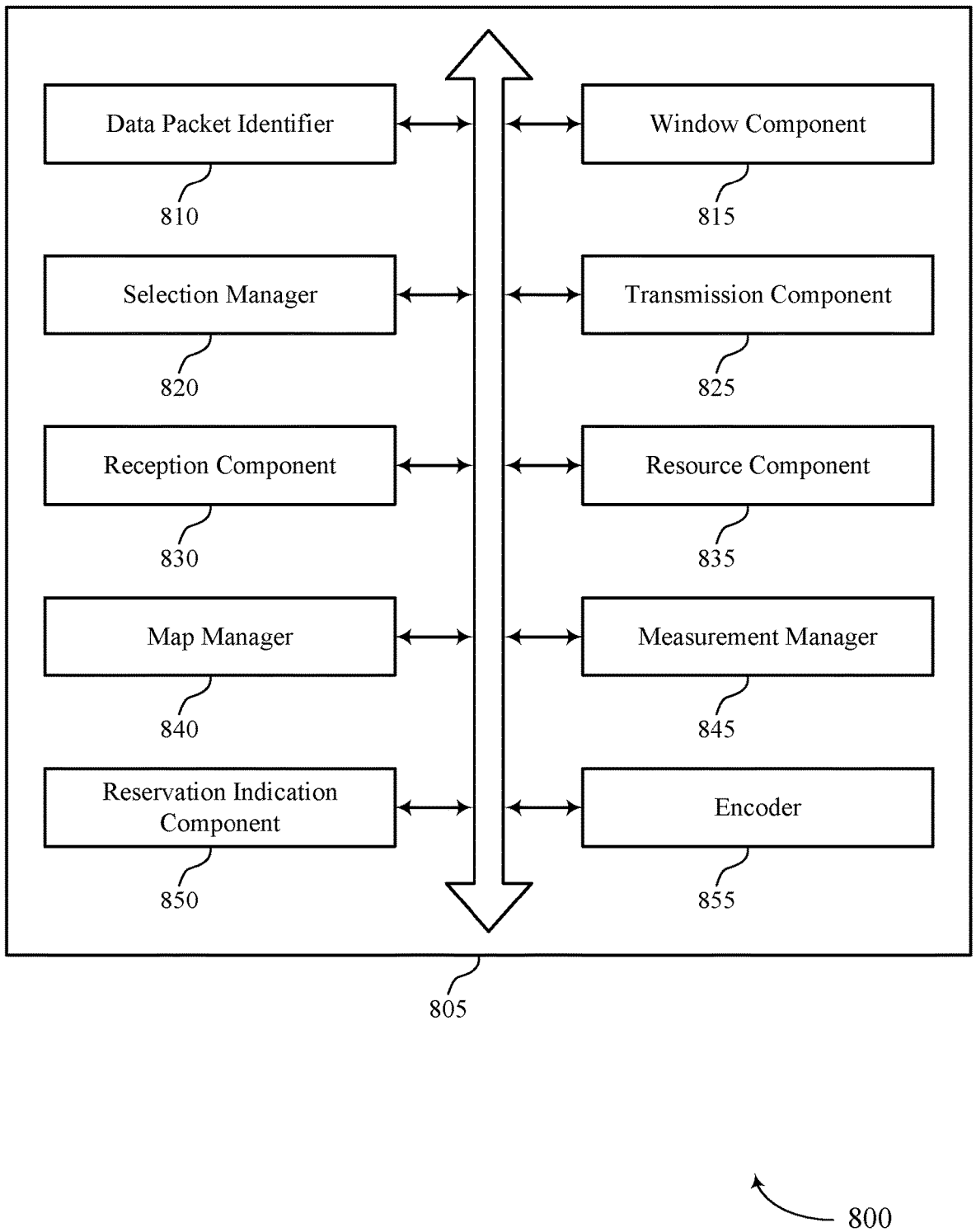
FIG. 8 shows a block diagram of a resource reservation manager that supports resource reservation techniques for wireless communications in accordance with aspects of the present disclosure.

FIG. 8 shows a block diagram 800 of a resource reservation manager 805 that supports resource reservation techniques for wireless communications in accordance with aspects of the present disclosure. The resource reservation manager 805 may be an example of aspects of a resource reservation manager 615, a resource reservation manager 715, or a resource reservation manager 910 described herein. The resource reservation manager 805 may include a data packet identifier 810, a window component 815, a selection manager 820, a transmission component 825, a reception component 830, a resource component 835, a map manager 840, a measurement manager 845, a reservation indication component 850, and an encoder 855. Each of these components may communicate, directly or indirectly, with one another (e.g., via one or more buses).

The data packet identifier 810 may identify, by a first wireless device in a V2X system, a data packet for transmission to a second wireless device in the V2X system, the data packet associated with a first latency type.

The window component 815 may identify a set of candidate TTIs for transmission of the data packet based on a resource window, where a size of the resource window is based on the first latency type. In some examples, the window component 815 may determine the size of the resource window based on the first latency type, an initial transmission of the data packet, a retransmission of the data packet, a capability of the first wireless device, a soft buffer of the second wireless device, or any combination thereof. In some cases, the window component 815 may determine an extended size of the resource window.

The selection manager 820 may select, from the set of candidate TTIs, a set of TTIs for transmission of the data packet based on the resource window and a set of reserved resources for other wireless devices in the V2X system. In some examples, the selection manager 820 may select an earliest unoccupied resource from the set of candidate TTIs. In some cases, the selection manager 820 may randomly select unoccupied TTIs from the set of candidate TTIs. In some instances, the selection manager 820 may select unoccupied resources in a TTI multiplexed in frequency with retransmissions from at least one other wireless device.

In some examples, the selection manager 820 may select unoccupied resources based on a size of the data packet. In some cases, the selection manager 820 may select unoccupied resources reserved for use by other wireless devices and associated with traffic having a lower priority than the data packet. In some aspects, the selection manager 820 may select the set of TTIs based on the extended size of the resource window. In some instances, the selection manager 820 may select, at the time of transmission of the data packet, the set of reserved resources for transmission of the second data packet based on a resource window and a latency type associated with the second data packet.

In some cases, the set of TTIs selected for transmission of the data packet exclude the set of reserved resources for other wireless devices in the V2X system. In some cases, the retransmissions from at least one other wireless device correspond to previously decoded data packets.

The transmission component 825 may transmit the data packet to the second wireless device using the set of TTIs. In some examples, the transmission component 825 may transmit the data packet to the second wireless device via the set of TTIs based on a resource window and a latency type associated with the data packet, where a set of reserved resources for transmission of a second data packet is selected at a time of transmission of the data packet.

The encoder 855 may encode the data packet across a set of TTIs. In some examples, the encoder 855 may encode the data packet across a set of frequency resources based on a link budget for transmission of the data packet.

The reception component 830 may receive a control channel from the second wireless device or another wireless device in the V2X system. In some examples, the reception component 830 may receive a reservation indication from at least one other wireless device, the reservation indication indicating a set of unoccupied resources reserved for the at least one other wireless device.

The resource component 835 may determine the set of reserved resources for other wireless devices in the V2X system based on the control channel.

The map manager 840 may maintain, by the first wireless device, a map of the set of reserved resources for other wireless devices in the V2X system.

The measurement manager 845 may determine a signal strength of the reservation indication, where the unoccupied resources are selected from the set of unoccupied resources based on the signal strength. In some examples, the measurement manager 845 may identify a distance associated with the set of reserved resources, where the set of TTIs exclude a subset of the reserved resources based on the distance and a distance threshold.

The reservation indication component 850 may transmit a reservation indication that conveys the set of TTIs selected for transmission of the data packet. In some examples, the reservation indication component 850 may transmit a reservation indication that conveys the set of reserved resources for transmission of the second data packet. In some cases, the reservation indication component 850 may receive a reservation indication from at least one other wireless device, the reservation indication indicating a set of unoccupied resources reserved for the at least one other wireless device. In some aspects, the reservation indication is transmitted via a control channel.

In some instances, the reservation indication includes a slot index, a sub-channel index, or a combination thereof. In some cases, the slot index is indicated with respect to a reference slot, the reference slot including one of a slot after a control channel associated with transmission of the data packet or a last slot used for transmission of the data packet. In some cases, the sub-channel index indicates a sub-channel with respect to a start of a resource pool used for transmission of the data packet. In some cases, the reservation indication includes ten bits. In some cases, the reservation indication is transmitted via a control channel.

Figure 9:
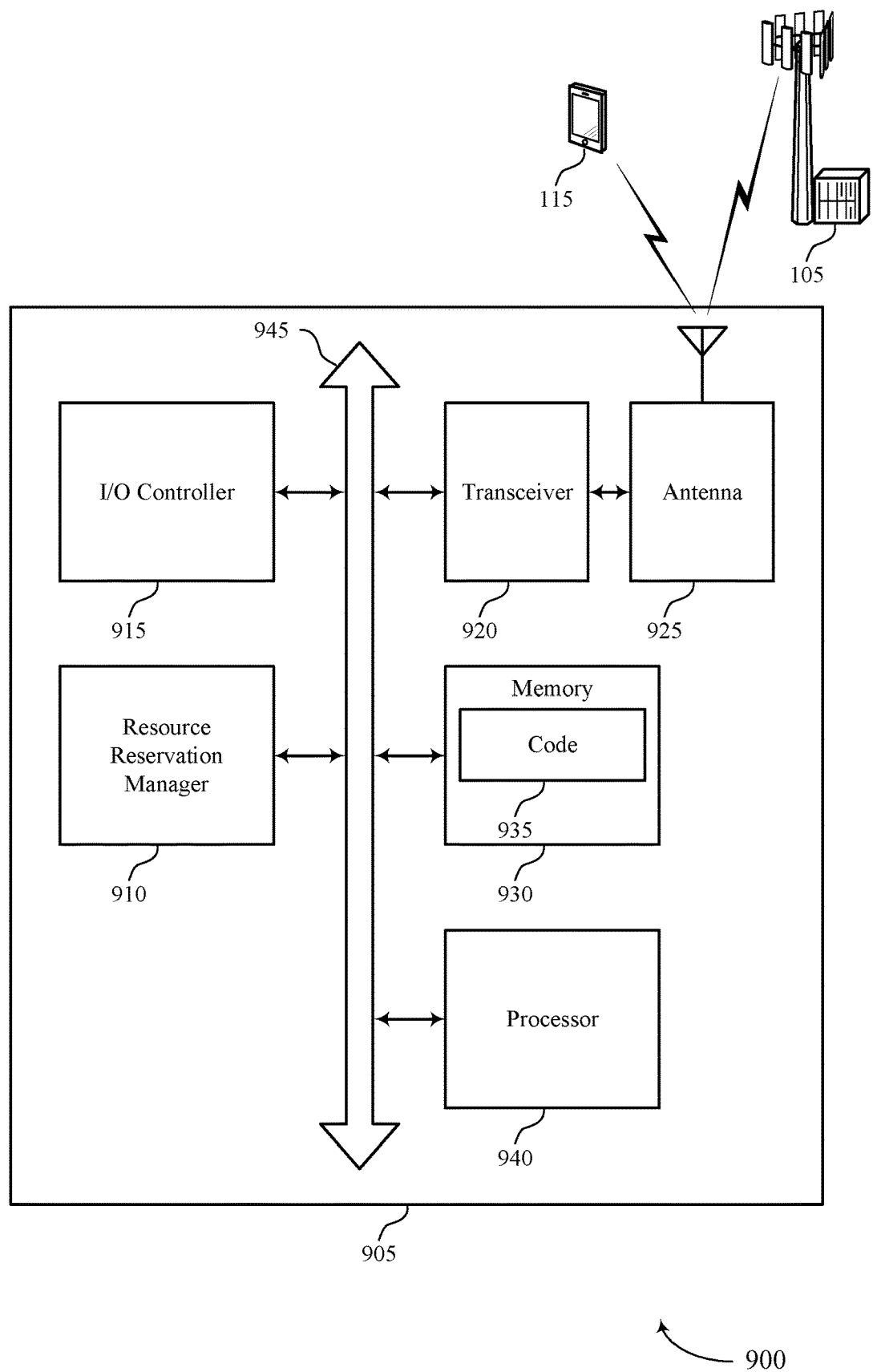
FIG. 9 shows a diagram of a system including a device that supports resource reservation techniques for wireless communications in accordance with aspects of the present disclosure.

FIG. 9 shows a diagram of a system 900 including a device 905 that supports resource reservation techniques for wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a resource reservation manager 910, an I/O controller 915, a transceiver 920, an antenna 925, memory 930, and a processor 940. These components may be in electronic communication via one or more buses (e.g., bus 945).

The resource reservation manager 910 may identify, by a first wireless device in a V2X system, a data packet for transmission to a second wireless device in the V2X system, the data packet associated with a first latency type, identify a set of candidate TTIs for transmission of the data packet based on a resource window, where a size of the resource window is based on the first latency type, select, from the set of candidate TTIs, a set of TTIs for transmission of the data packet based on the resource window and a set of reserved resources for other wireless devices in the V2X system, and transmit the data packet to the second wireless device using the set of transmission time intervals.

The resource reservation manager 910 may also identify, by a first wireless device in a V2X system, a data packet for transmission to a second wireless device in the V2X system, transmit the data packet to the second wireless device via a set of transmission time intervals based on a resource window and a latency type associated with the data packet, select, at the time of transmission of the data packet, a set of reserved resources for transmission of a second data packet based at least in part on a resource window and a latency type associated with the second data packet, and transmit a reservation indication that conveys the set of reserved resources for transmission of the second data packet.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource reservation techniques for wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
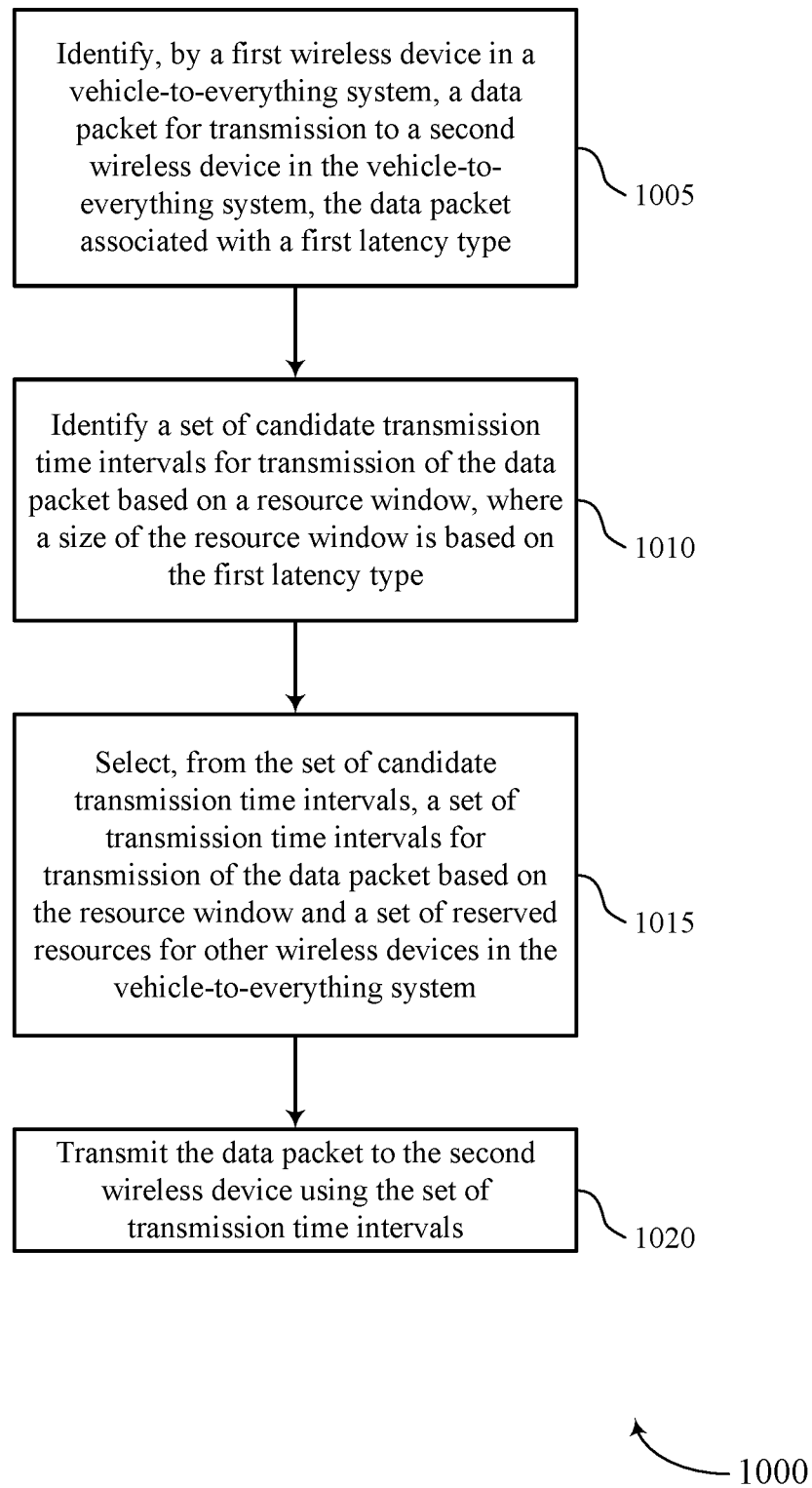
FIGS. 10 through 15 show flowcharts illustrating methods that support resource reservation techniques for wireless communications in accordance with aspects of the present disclosure.

FIG. 10 shows a flowchart illustrating a method 1000 that supports resource reservation techniques for wireless communications in accordance with aspects of the present disclosure. The operations of method 1000 may be implemented by a UE 115 or its components as described herein. For example, the operations of method 1000 may be performed by a resource reservation manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may identify, by a first wireless device in a V2X system, a data packet for transmission to a second wireless device in the V2X system, the data packet associated with a first latency type. The operations of 1005 may be performed according to the methods described herein. In some examples, aspects of the operations of 1005 may be performed by a data packet identifier as described with reference to FIGS. 6 through 9.

At 1010, the UE may identify a set of candidate TTIs for transmission of the data packet based on a resource window, where a size of the resource window is based on the first latency type. The operations of 1010 may be performed according to the methods described herein. In some examples, aspects of the operations of 1010 may be performed by a window component as described with reference to FIGS. 6 through 9.

At 1015, the UE may select, from the set of candidate TTIs, a set of TTIs for transmission of the data packet based on the resource window and a set of reserved resources for other wireless devices in the V2X system. The operations of 1015 may be performed according to the methods described herein. In some examples, aspects of the operations of 1015 may be performed by a selection manager as described with reference to FIGS. 6 through 9.

At 1020, the UE may transmit the data packet to the second wireless device using the set of TTIs. The operations of 1020 may be performed according to the methods described herein. In some examples, aspects of the operations of 1020 may be performed by a transmission component as described with reference to FIGS. 6 through 9.

Figure 11:
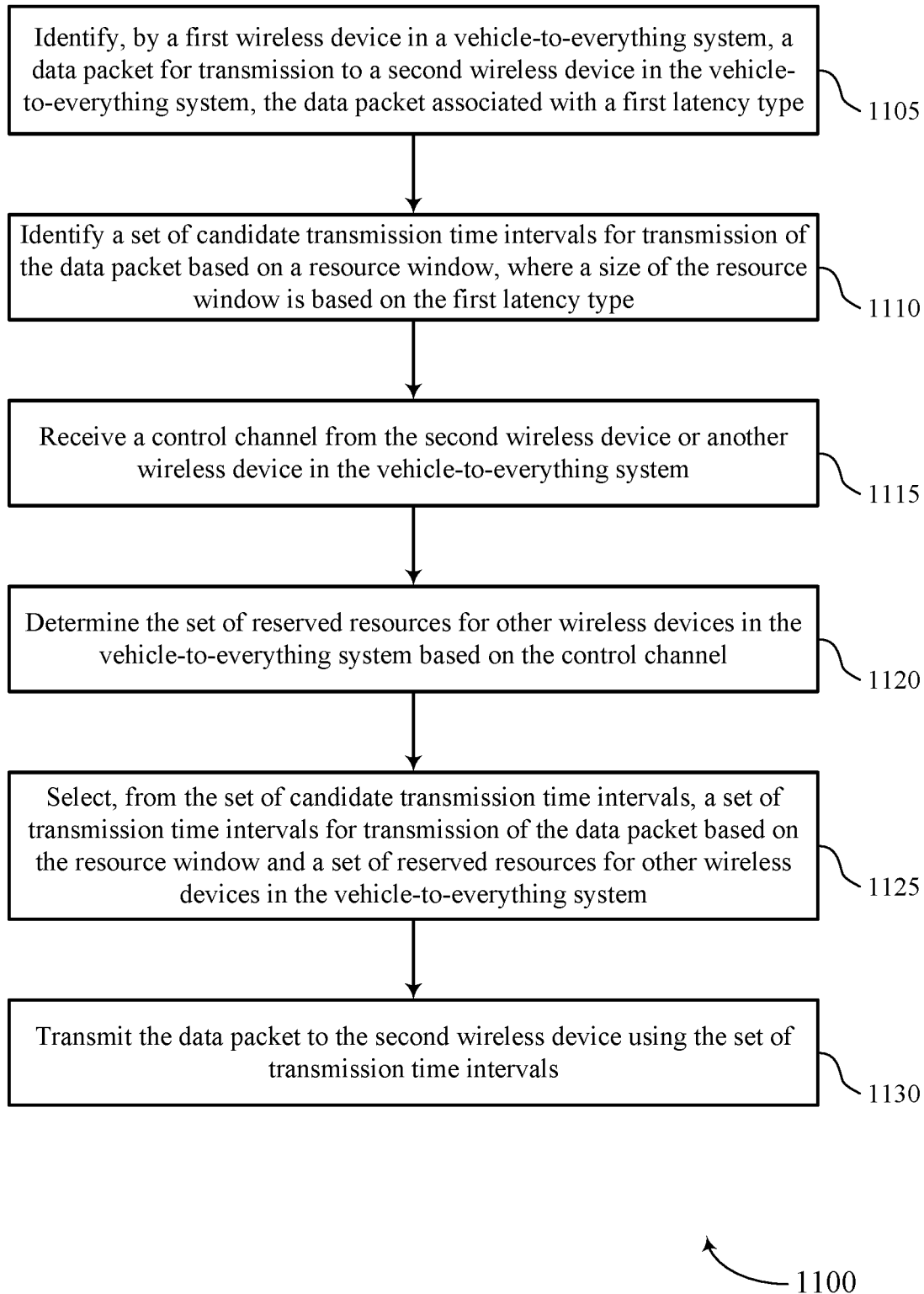

FIG. 11 shows a flowchart illustrating a method 1100 that supports resource reservation techniques for wireless communications in accordance with aspects of the present disclosure. The operations of method 1100 may be implemented by a UE 115 or its components as described herein. For example, the operations of method 1100 may be performed by a resource reservation manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may identify, by a first wireless device in a V2X system, a data packet for transmission to a second wireless device in the V2X system, the data packet associated with a first latency type. The operations of 1105 may be performed according to the methods described herein. In some examples, aspects of the operations of 1105 may be performed by a data packet identifier as described with reference to FIGS. 6 through 9.

At 1110, the UE may identify a set of candidate TTIs for transmission of the data packet based on a resource window, where a size of the resource window is based on the first latency type. The operations of 1110 may be performed according to the methods described herein. In some examples, aspects of the operations of 1110 may be performed by a window component as described with reference to FIGS. 6 through 9.

At 1115, the UE may receive a control channel from the second wireless device or another wireless device in the V2X system. The operations of 1115 may be performed according to the methods described herein. In some examples, aspects of the operations of 1115 may be performed by a reception component as described with reference to FIGS. 6 through 9.

At 1120, the UE may determine the set of reserved resources for other wireless devices in the V2X system based on the control channel. The operations of 1120 may be performed according to the methods described herein. In some examples, aspects of the operations of 1120 may be performed by a resource component as described with reference to FIGS. 6 through 9.

At 1125, the UE may select, from the set of candidate TTIs, a set of TTIs for transmission of the data packet based on the resource window and a set of reserved resources for other wireless devices in the V2X system. The operations of 1125 may be performed according to the methods described herein. In some examples, aspects of the operations of 1125 may be performed by a selection manager as described with reference to FIGS. 6 through 9.

At 1130, the UE may transmit the data packet to the second wireless device using the set of TTIs. The operations of 1130 may be performed according to the methods described herein. In some examples, aspects of the operations of 1130 may be performed by a transmission component as described with reference to FIGS. 6 through 9.

Figure 12:
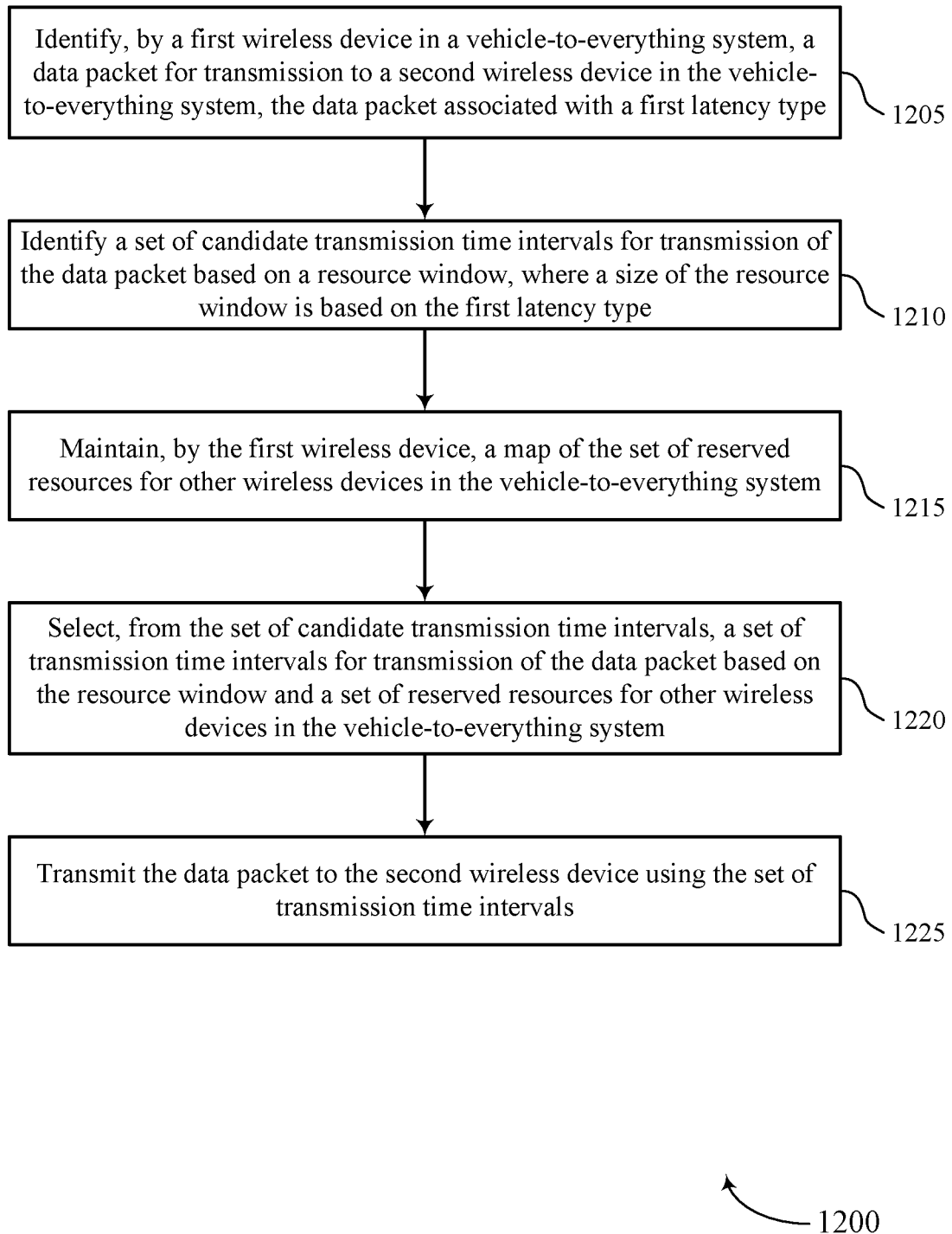

FIG. 12 shows a flowchart illustrating a method 1200 that supports resource reservation techniques for wireless communications in accordance with aspects of the present disclosure. The operations of method 1200 may be implemented by a UE 115 or its components as described herein. For example, the operations of method 1200 may be performed by a resource reservation manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may identify, by a first wireless device in a V2X system, a data packet for transmission to a second wireless device in the V2X system, the data packet associated with a first latency type. The operations of 1205 may be performed according to the methods described herein. In some examples, aspects of the operations of 1205 may be performed by a data packet identifier as described with reference to FIGS. 6 through 9.

At 1210, the UE may identify a set of candidate TTIs for transmission of the data packet based on a resource window, where a size of the resource window is based on the first latency type. The operations of 1210 may be performed according to the methods described herein. In some examples, aspects of the operations of 1210 may be performed by a window component as described with reference to FIGS. 6 through 9.

At 1215, the UE may maintain, by the first wireless device, a map of the set of reserved resources for other wireless devices in the V2X system. The operations of 1215 may be performed according to the methods described herein. In some examples, aspects of the operations of 1215 may be performed by a map manager as described with reference to FIGS. 6 through 9.

At 1220, the UE may select, from the set of candidate TTIs, a set of TTIs for transmission of the data packet based on the resource window and a set of reserved resources for other wireless devices in the V2X system. The operations of 1220 may be performed according to the methods described herein. In some examples, aspects of the operations of 1220 may be performed by a selection manager as described with reference to FIGS. 6 through 9.

At 1225, the UE may transmit the data packet to the second wireless device using the set of TTIs. The operations of 1225 may be performed according to the methods described herein. In some examples, aspects of the operations of 1225 may be performed by a transmission component as described with reference to FIGS. 6 through 9.

Figure 13:
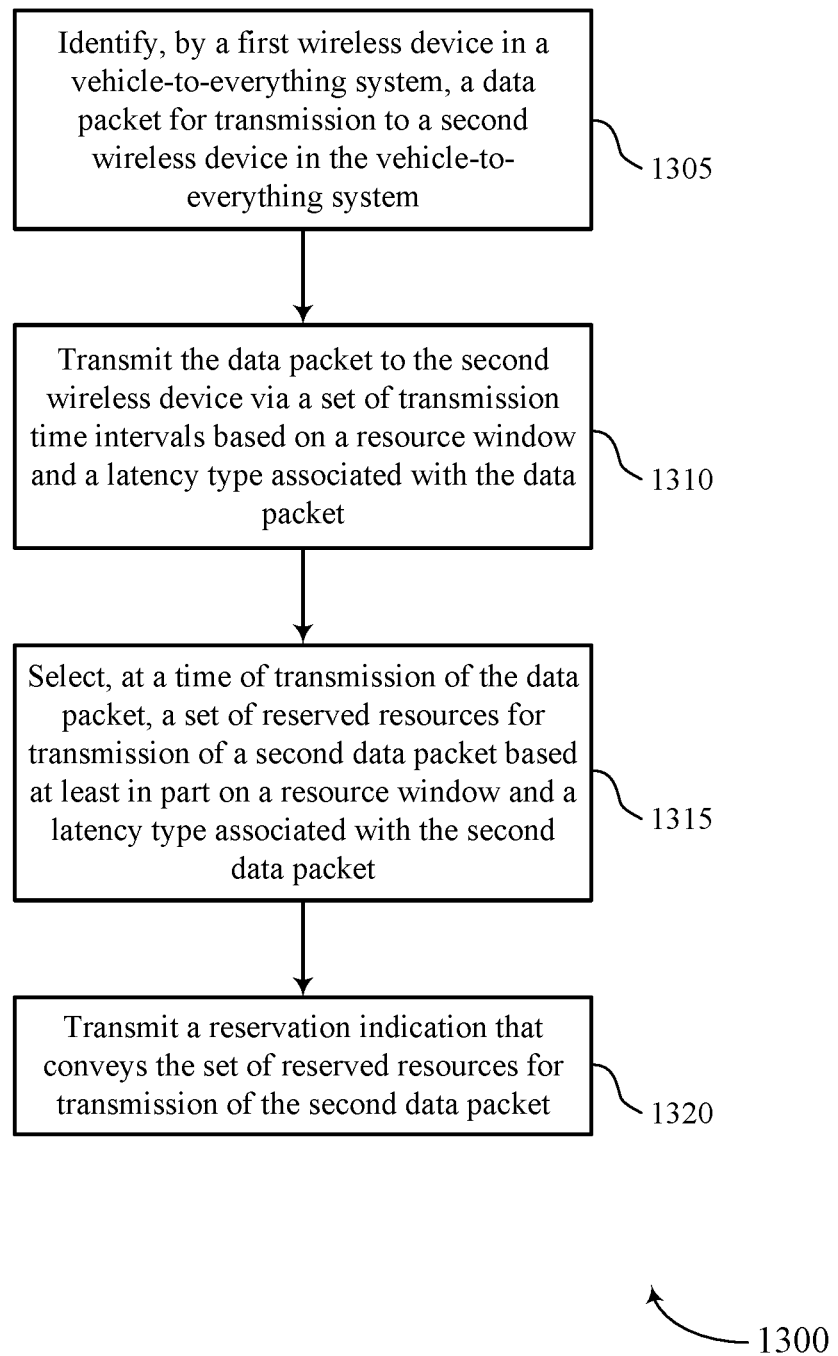

FIG. 13 shows a flowchart illustrating a method 1300 that supports resource reservation techniques for wireless communications in accordance with aspects of the present disclosure. The operations of method 1300 may be implemented by a UE 115 or its components as described herein. For example, the operations of method 1300 may be performed by a resource reservation manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may identify, by a first wireless device in a V2X system, a data packet for transmission to a second wireless device in the V2X system. The operations of 1305 may be performed according to the methods described herein. In some examples, aspects of the operations of 1305 may be performed by a data packet identifier as described with reference to FIGS. 6 through 9.

At 1310, the UE may transmit the data packet to the second wireless device via a set of TTIs based on a resource window and a latency type associated with the data packet. The operations of 1310 may be performed according to the methods described herein. In some examples, aspects of the operations of 1310 may be performed by a transmission component as described with reference to FIGS. 6 through 9.

At 1315, the UE may select, at a time of transmission of the data packet, a set of reserved resources for transmission of a second data packet based at least in part on a resource window and a latency type associated with the second data packet. The operations of 1315 may be performed according to the methods described herein. In some examples, aspects of the operations of 1315 may be performed by a selection manager as described with reference to FIGS. 6 through 9.

At 1320, the UE may transmit a reservation indication that conveys the set of reserved resources for transmission of the second data packet. The operations of 1320 may be performed according to the methods described herein. In some examples, aspects of the operations of 1320 may be performed by a reservation indication component as described with reference to FIGS. 6 through 9.

Figure 14:
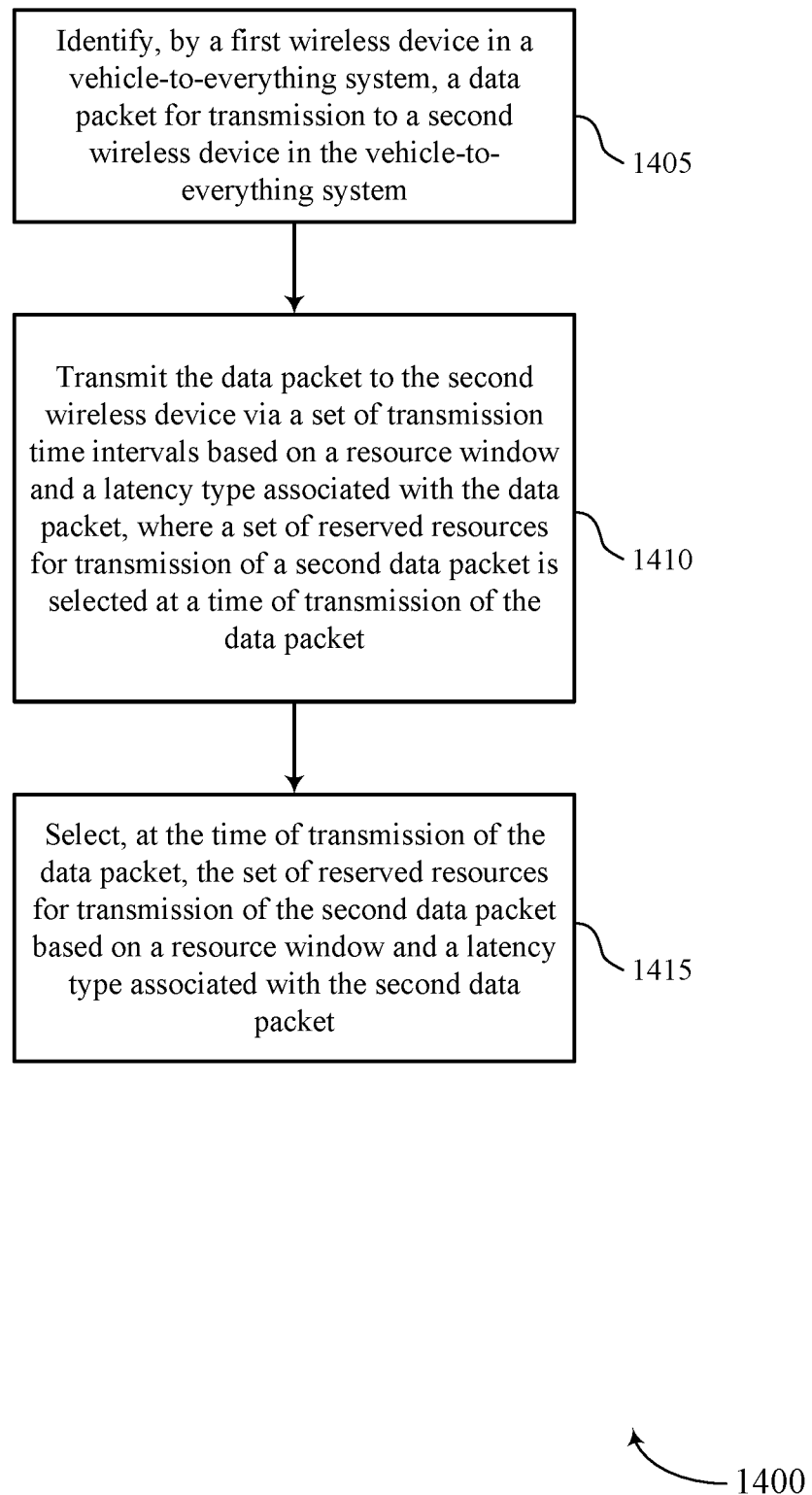

FIG. 14 shows a flowchart illustrating a method 1400 that supports resource reservation techniques for wireless communications in accordance with aspects of the present disclosure. The operations of method 1400 may be implemented by a UE 115 or its components as described herein. For example, the operations of method 1400 may be performed by a resource reservation manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify, by a first wireless device in a V2X system, a data packet for transmission to a second wireless device in the V2X system. The operations of 1405 may be performed according to the methods described herein. In some examples, aspects of the operations of 1405 may be performed by a data packet identifier as described with reference to FIGS. 6 through 9.

At 1410, the UE may transmit the data packet to the second wireless device via a set of TTIs based on a resource window and a latency type associated with the data packet, where a set of reserved resources for transmission of a second data packet is selected at a time of transmission of the data packet. The operations of 1410 may be performed according to the methods described herein. In some examples, aspects of the operations of 1410 may be performed by a transmission component as described with reference to FIGS. 6 through 9.

At 1415, the UE may select, at the time of transmission of the data packet, the set of reserved resources for transmission of the second data packet based on a resource window and a latency type associated with the second data packet. The operations of 1415 may be performed according to the methods described herein. In some examples, aspects of the operations of 1415 may be performed by a selection manager as described with reference to FIGS. 6 through 9.

Figure 15:
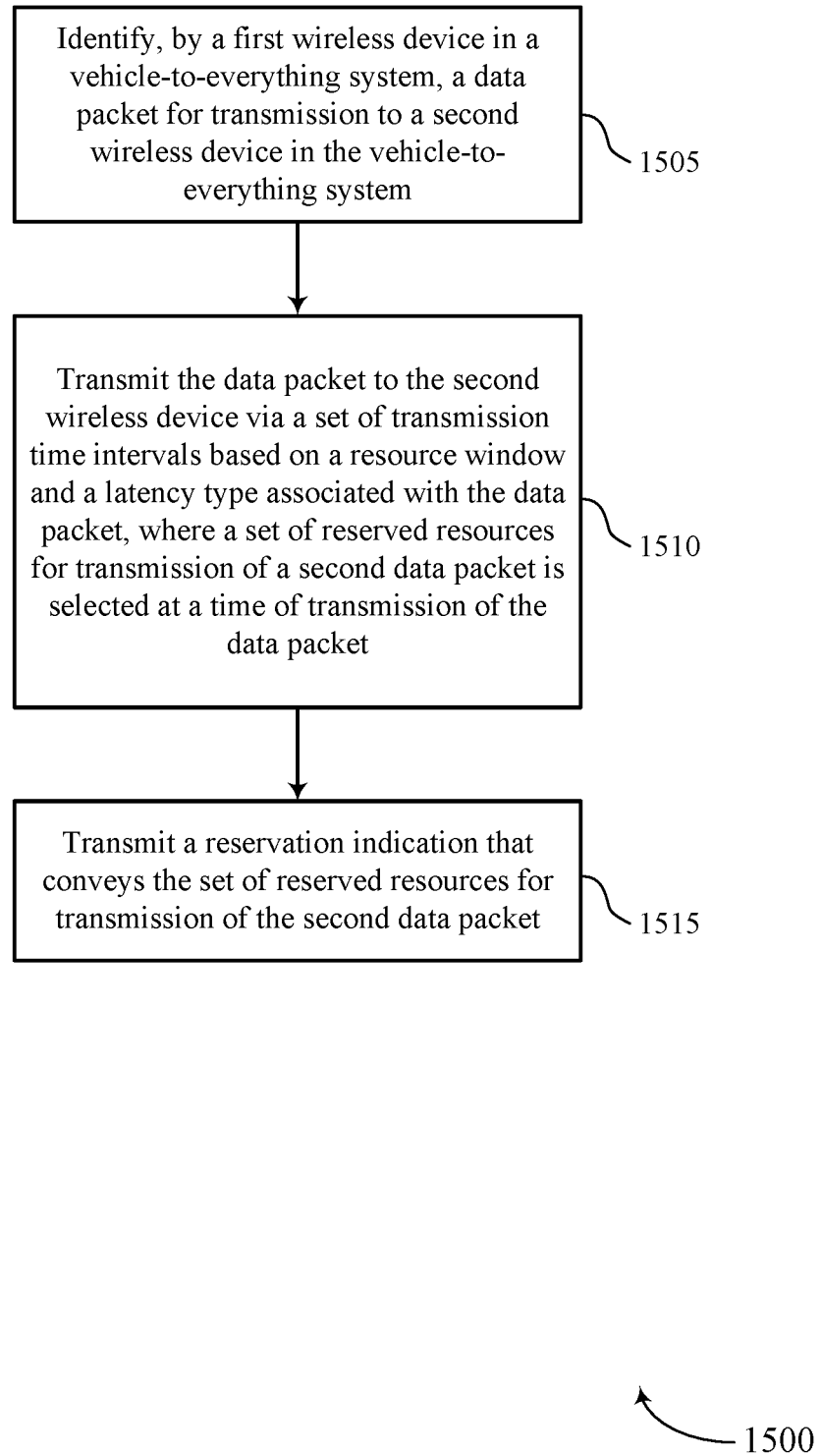

FIG. 15 shows a flowchart illustrating a method 1500 that supports resource reservation techniques for wireless communications in accordance with aspects of the present disclosure. The operations of method 1500 may be implemented by a UE 115 or its components as described herein. For example, the operations of method 1500 may be performed by a resource reservation manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify, by a first wireless device in a V2X system, a data packet for transmission to a second wireless device in the V2X system. The operations of 1505 may be performed according to the methods described herein. In some examples, aspects of the operations of 1505 may be performed by a data packet identifier as described with reference to FIGS. 6 through 9.

At 1510, the UE may transmit the data packet to the second wireless device via a set of TTIs based on a resource window and a latency type associated with the data packet, where a set of reserved resources for transmission of a second data packet is selected at a time of transmission of the data packet. The operations of 1510 may be performed according to the methods described herein. In some examples, aspects of the operations of 1510 may be performed by a transmission component as described with reference to FIGS. 6 through 9.

At 1515, the UE may transmit a reservation indication that conveys the set of reserved resources for transmission of the second data packet. The operations of 1515 may be performed according to the methods described herein. In some examples, aspects of the operations of 1515 may be performed by a reservation indication component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Example 1: A method of wireless communications comprising identifying, by a first device in a vehicle to everything system, a data packet for transmission to a second wireless device in the vehicle-to-everything system, the data packet associated with a first latency type, identifying a set of candidate transmission time intervals for the transmission of the data packet based at least in part on a resource window, wherein a size of the resource window is based at least in part on the first latency type, selecting, from the set of candidate transmission time intervals, a set of transmission time intervals for the transmission of the data packet based at least in part on the resource window and a set of reserved resources for other wireless devices in the vehicle-to-everything system, and transmitting the data packet to the second wireless device using the set of transmission time intervals.

Example 2: The method of example 1, further comprising: determining the size of the resource window based on the first latency type, an initial transmission of the data packet, a retransmission of the data packet, a capability of the first wireless device, a soft buffer of the second wireless device, or any combination thereof.

Example 3: The method of any of examples 1 to 2, further comprising: receiving a control channel from the second wireless device or another wireless device in the V2X system, and determining the set of reserved resources for other wireless devices in the V2X system based on the control channel.

Example 4: The method of any of examples 1 to 3, further comprising: maintaining, by the first wireless device, a map of the set of reserved resources for other wireless devices in the V2X system.

Example 5: The method of any of examples 1 to 4, wherein the set of TTIs selected for transmission of the data packet exclude the set of reserved resources for other wireless devices in the V2X system.

Example 6: The method of any of examples 1 to 5, wherein selecting the set of TTIs may include selecting an earliest unoccupied resource from the set of candidate TTIs.

Example 7: The method of any of examples 1 to 5, wherein selecting the set of TTIs may include randomly selecting unoccupied TTIs from the set of candidate TTIs.

Example 8: The method of any of examples 1 to 5, wherein selecting the set of TTIs may include selecting unoccupied resources in a TTI multiplexed in frequency with retransmissions from at least one other wireless device, the retransmissions from the at least one other wireless device corresponding to previously decoded data packets.

Example 9: The method of any of examples 1 to 5, wherein selecting the set of TTIs may include selecting unoccupied resources based on a size of the data packet.

Example 10: The method of any of examples 1 to 5, wherein selecting the set of TTIs may include selecting resources reserved for use by other wireless devices and associated with traffic having a lower priority than the data packet.

Example 11: The method of example 10, further comprising: receiving a reservation indication from at least one other wireless device, the reservation indication indicating a set of resources reserved for the at least one other wireless device and determining a signal strength of the reservation indication, where the resources may be selected from the set of resources based on the signal strength.

Example 12: The method of any of examples 1 to 11, further comprising: identifying a distance associated with the set of reserved resources, where the set of TTIs exclude a subset of the reserved resources based on the distance and a distance threshold.

Example 13: The method of any of examples 1 to 12, further comprising: determining an extended size of the resource window and selecting the set of TTIs based on the extended size of the resource window.

Example 14: The method of any of examples 1 to 13, further comprising: transmitting, via a control channel, a reservation indication that conveys the set of TTIs selected for transmission of the data packet, wherein the reservation indication comprises a slot index, a sub-channel index, or a combination thereof based at least in part on a defined number of bits. In some example, the reservation indication may include 10 bits.

Example 15: The method of example 14, wherein the slot index may be indicated with respect to a reference slot, the reference slot including one of a slot after a control channel associated with transmission of the data packet or a last slot used for transmission of the data packet.

Example 16: The method of example 14, wherein the sub-channel index indicates a sub-channel with respect to a start of a resource pool used for transmission of the data packet.

Example 17: A method of wireless communications comprising identifying, by a first wireless device in a V2X system, a data packet for transmission to a second wireless device in the vehicle-to-everything system, transmitting the data packet to the second wireless device via a set of transmission time intervals based at least in part on a resource window and a latency type associated with the data packet, selecting, at a time of the transmission of the data packet, a set of reserved resources for transmission of a second data packet based at least in part on a second resource window and a second latency type associated with the second data packet, and transmitting a reservation indication that conveys the set of reserved resources for the transmission of the second data packet.

Example 18: The method of example 17, further comprising: encoding the data packet across the set of TTIs.

Example 19: The method of any of examples 17 to 18, further comprising: encoding the data packet across a set of frequency resources based on a link budget for transmission of the data packet.

Example 20: The method of any of examples 17 to 19, further comprising: transmitting, via a control channel, the reservation indication, wherein the reservation indication comprises a slot index, a sub-channel index, or a combination thereof based at least in part on a defined number of bits.

Example 21: The method of example 20, wherein the slot index may be indicated with respect to a reference slot, the reference slot including one of a slot after a control channel associated with transmission of the data packet or a last slot used for transmission of the data packet.

Example 22: The method of example 20, wherein the sub-channel index indicates a sub-channel with respect to a start of a resource pool used for transmission of the data packet.

Example 23: The method of any of examples 17 to 22, wherein selecting the set of reserved resources may include selecting an earliest unoccupied resource from the set of TTIs.

Example 24: The method of any of examples 17 to 22, wherein selecting the set of reserved resources may include randomly selecting unoccupied TTIs from the set of TTIs.

Example 25: The method of any of examples 17 to 22, wherein selecting the set of reserved resources may include selecting unoccupied resources in a TTI multiplexed in frequency with retransmissions from at least one other wireless device, the retransmissions from the at least one other wireless device corresponding to previously decoded data packets.

Example 26: The method of any of examples 17 to 22, wherein selecting the set of reserved resources may include selecting unoccupied resources based on a size of the second data packet.

Example 27: The method of any of examples 17 to 22, wherein selecting the set of reserved resources may include selecting resources reserved for use by other wireless devices and associated with traffic having a lower priority than the data packet.

Example 28: The method of any of examples 17 to 27, further comprising: receiving a second reservation indication from at least one other wireless device, the second reservation indication indicating a set of resources reserved for the at least one other wireless device, and determining a signal strength of the second reservation indication, where the resources may be selected from the set of resources based on the signal strength.

Example 29: An apparatus for wireless communications comprising a processor; memory in electronic communication with the processor; and instructions stored in the memory and executable by the processor to cause the apparatus to perform a method of any of examples 1 to 16.

Example 30: An apparatus for wireless communications comprising a processor; memory in electronic communication with the processor; and instructions stored in the memory and executable by the processor to cause the apparatus to perform a method of any of examples 17 to 28.

Example 31: An apparatus comprising at least one means for performing a method of any of examples 1 to 16.

Example 32: An apparatus comprising at least one means for performing a method of any of examples 17 to 28.

Example 33: A non-transitory computer-readable medium storing code for wireless communications, the code comprising instructions executable by a processor to perform a method of any of examples 1 to 16.

Example 34: A non-transitory computer-readable medium storing code for wireless communications, the code comprising instructions executable by a processor to perform a method of any of examples 17 to 28.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising, by a first wireless device in a vehicle-to-everything system:
    identifying a data packet for transmission to a second wireless device in the vehicle-to-everything system, the data packet associated with a first latency type;
    identifying a set of candidate transmission time intervals for the transmission of the data packet based at least in part on a resource window, wherein a size of the resource window is based at least in part on the first latency type;
    selecting, from the set of candidate transmission time intervals, a set of transmission time intervals for the transmission of the data packet based at least in part on a resource map indicative, at least in part, of a set of reserved resources for other wireless devices in the vehicle-to-everything system, wherein selecting the set of transmission time intervals comprises:
    selecting unoccupied resources in a transmission time interval multiplexed in frequency with retransmissions from at least one other wireless device, the retransmissions from the at least one other wireless device corresponding to previously decoded data packets; and
    transmitting the data packet to the second wireless device using the set of transmission time intervals.

2. The method of claim 1, wherein selecting the set of transmission time intervals comprises:
    selecting resources reserved for use by other wireless devices and associated with traffic having a lower priority than the data packet.

3. The method of claim 1, wherein selecting the set of transmission time intervals comprises:
    selecting unoccupied resources based at least in part on a size of the data packet.

4. The method of claim 1, further comprising, by the first wireless device:
    receiving a reservation indication from at least one other wireless device, the reservation indication indicating a set of unoccupied resources reserved for the at least one other wireless device; and
    determining a signal strength of the reservation indication, wherein resources are selected from the resource map of the set of reserved resources based at least in part on the signal strength.

5. The method of claim 1, further comprising, by the first wireless device:
    receiving a control channel from the second wireless device or another wireless device in the vehicle-to-everything system, wherein at least a portion of the set of reserved resources for other wireless devices in the vehicle-to-everything system is based at least in part on the control channel.

6. The method of claim 5, further comprising, by the first wireless device:
    determining the set of reserved resources for other wireless devices in the vehicle-to-everything system based at least in part on the control channel.

7. The method of claim 1, further comprising:
    maintaining, by the first wireless device, a map of the set of reserved resources for other wireless devices in the vehicle-to-everything system.

8. The method of claim 1, wherein selecting the set of transmission time intervals comprises:
    selecting an earliest unoccupied resource from the resource map of the set of candidate transmission time intervals.

9. The method of claim 1, wherein the resource map is further indicative of at least one distance metric associated with a subset of the set of reserved resources, and the set of transmission time intervals, as selected, exclude the subset of the set of reserved resources based at least in part on a comparison of the at least one distance metric and a distance metric threshold.

10. The method of claim 1, further comprising, by the first wireless device:
    determining an extended size of the resource window; and
    selecting the set of transmission time intervals based at least in part on the extended size of the resource window.

11. The method of claim 1, further comprising, by the first wireless device:
    transmitting, via a control channel, a reservation indication that conveys the set of transmission time intervals selected for the transmission of the data packet, wherein the reservation indication comprises a slot index, a sub-channel index, or a combination thereof based at least in part on a defined number of bits.

12. The method of claim 11, wherein the slot index is indicated with respect to a reference slot, the reference slot comprising one of a slot after a second control channel associated with the transmission of the data packet or a last slot used for the transmission of the data packet.

13. The method of claim 11, wherein the sub-channel index indicates a sub-channel with respect to a start of a resource pool used for the transmission of the data packet.

14. The method of claim 11, wherein the reservation indication comprises ten bits.

15. A method for wireless communications, comprising:
identifying, by a first wireless device in a vehicle-to-everything system, a data packet for transmission to a second wireless device in the vehicle-to-everything system;
transmitting the data packet to the second wireless device via a set of transmission time intervals based at least in part on a resource window and a latency type associated with the data packet;
selecting, at a time of the transmission of the data packet, a set of reserved resources for transmission of a second data packet based at least in part on a second resource window and a second latency type associated with the second data packet, wherein selecting the set of reserved resources comprises selecting unoccupied resources based at least in part on a size of the second data packet and selecting unoccupied resources in a transmission time interval multiplexed in frequency with retransmissions from at least one other wireless device, the retransmissions from the at least one other wireless device corresponding to previously decoded data packets; and
transmitting a reservation indication that conveys the set of reserved resources for the transmission of the second data packet.

16. The method of claim 15, further comprising:
encoding the data packet across the set of transmission time intervals.

17. The method of claim 15, further comprising:
encoding the data packet across a set of frequency resources based at least in part on a link budget for the transmission of the data packet.

18. The method of claim 15, wherein transmitting the reservation indication further comprises:
transmitting, via a control channel, the reservation indication, wherein the reservation indication comprises a slot index, a sub-channel index, or a combination thereof based at least in part on a defined number of bits.

19. The method of claim 18, wherein the reservation indication comprises ten bits.

20. The method of claim 18, wherein the slot index is indicated with respect to a reference slot, the reference slot comprising one of a slot after a second control channel associated with the transmission of the data packet or a last slot used for the transmission of the data packet.

21. The method of claim 18, wherein the sub-channel index indicates a sub-channel with respect to a start of a resource pool used for the transmission of the data packet.

22. The method of claim 15, wherein selecting the set of reserved resources comprises:
selecting an earliest unoccupied resource from the set of transmission time intervals.

23. The method of claim 15, wherein selecting the set of reserved resources comprises:
selecting one or more unoccupied resources of an unoccupied transmission time interval based on the size of the second data packet.

24. The method of claim 15, wherein selecting the set of reserved resources comprises:
selecting unoccupied resources reserved for use by other wireless devices and associated with traffic having a lower priority than the data packet.

25. The method of claim 24, further comprising:
receiving a second reservation indication from at least one other wireless device, the second reservation indication indicating a set of resources reserved for the at least one other wireless device; and
determining a signal strength of the second reservation indication, wherein the unoccupied resources are selected from the set of resources based at least in part on the signal strength.

26. An apparatus for use in a first wireless device in a vehicle-to-everything system, the apparatus comprising:
one or more processors, one or more memories in electronic communication with the one or more processors; and
instructions stored in the one or more memories and executable by the one or more processors to cause the apparatus to:
identify a data packet for transmission to a second wireless device in the vehicle-to-everything system, the data packet associated with a first latency type;
identify a set of candidate transmission time intervals for the transmission of the data packet based at least in part on a resource window, wherein a size of the resource window is based at least in part on the first latency type;
select, from the set of candidate transmission time intervals, a set of transmission time intervals for the transmission of the data packet based at least in part on a resource map indicative, at least in part, of a set of reserved resources for other wireless devices in the vehicle-to-everything system, wherein selecting the set of reserved resources comprises:
selecting unoccupied resources in a transmission time interval multiplexed in frequency with retransmissions from at least one other wireless device, the retransmissions from the at least one other wireless device corresponding to previously decoded data packets; and
transmit the data packet to the second wireless device using the set of transmission time intervals.

27. The apparatus of claim 26, the resource map is further indicative of at least one distance metric associated with a subset of the set of reserved resources, and the set of transmission time intervals, as selected, exclude the subset of the set of reserved resources based at least in part on a comparison of the at least one distance metric and a distance metric threshold.

28. An apparatus for wireless communications, comprising:
one or more processors, one or more memories in electronic communication with the one or more processors; and
instructions stored in the one or more memories and executable by the one or more processors to cause the apparatus to:
identify, by a first wireless device in a vehicle-to-everything system, a data packet for transmission to a second wireless device in the vehicle-to-everything system;
transmit the data packet to the second wireless device via a set of transmission time intervals based at least in part on a resource window and a latency type associated with the data packet;
select, at a time of the transmission of the data packet, a set of reserved resources for transmission of a second data packet based at least in part on a second resource window and a second latency type associated with the second data packet, wherein selecting the set of reserved resources comprises selecting unoccupied resources based at least in part on a size of the second data packet and selecting unoccupied resources in a transmission time interval multiplexed in frequency with retransmissions from at least one other wireless device, the retransmissions from the at least one other wireless device corresponding to previously decoded data packets; and transmit a reservation indication that conveys the set of reserved resources for the transmission of the second data packet.

* * * * *